US010735132B2

(12) United States Patent
Rönneke et al.

(10) Patent No.: US 10,735,132 B2
(45) Date of Patent: Aug. 4, 2020

(54) SYSTEM, METHODS, AND APPARATUSES FOR MANAGING DATA RATE FOR CONTROL PLANE OPTIMIZATION

(71) Applicant: TELEFONAKTIEBOLAGET LM ERICSSON (PUBL), Stockholm (SE)

(72) Inventors: Hans Rönneke, Kungsbacka (SE); Peter Hedman, Helsingborg (SE); Lars-Bertil Olsson, Angered (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 15/319,842

(22) PCT Filed: Nov. 1, 2016

(86) PCT No.: PCT/EP2016/076290
§ 371 (c)(1),
(2) Date: Dec. 19, 2016

(87) PCT Pub. No.: WO2017/140387
PCT Pub. Date: Aug. 24, 2017

(65) Prior Publication Data
US 2018/0212710 A1    Jul. 26, 2018

Related U.S. Application Data

(60) Provisional application No. 62/296,952, filed on Feb. 18, 2016.

(51) Int. Cl.
*H04L 1/00*     (2006.01)
*H04W 28/02*    (2009.01)
(Continued)

(52) U.S. Cl.
CPC ............ *H04L 1/0002* (2013.01); *H04W 4/70* (2018.02); *H04W 28/02* (2013.01); *H04W 28/12* (2013.01); *H04W 88/16* (2013.01); *H04W 72/04* (2013.01)

(58) Field of Classification Search
CPC ......... H04L 47/70; H04L 47/72; H04L 47/74; H04L 47/78; H04L 47/80; H04L 47/10;
(Continued)

(56) References Cited

U.S. PATENT DOCUMENTS 8,867,476 B2    10/2014  Jain et al.
2013/0100895 A1  4/2013  Aghili et al.
(Continued)

FOREIGN PATENT DOCUMENTS

EP    2369883 A1    9/2011
EP    2 509 345 A1  10/2012
(Continued)

OTHER PUBLICATIONS

International Search Report and Written Opinion issued in corresponding International Application No. PCT/EP2016/076290 dated Feb. 17, 2017, 12 pages.
(Continued)

*Primary Examiner* — Dady Chery
(74) *Attorney, Agent, or Firm* — Rothwell, Figg, Ernst & Manbeck, P.C.

(57) ABSTRACT

In one aspect, an MME throttles (or otherwise controls) the amount or frequency of UL data that a UE transmits in the control plane, such as by communicating to the UE rate control information (e.g., a throttling factor or throttling delay). For instance, the MME may throttle NAS messages with user data (i.e., NAS Data PDUs) sent using control plane CIoT EPS optimization by adding a throttling factor and/or a throttling delay in a NAS message sent to the UE.

18 Claims, 15 Drawing Sheets

(51) Int. Cl.
*H04W 4/70* (2018.01)
*H04W 28/12* (2009.01)
*H04W 88/16* (2009.01)
*H04W 72/04* (2009.01)

(58) Field of Classification Search
CPC .. H04L 47/52; H04W 28/02; H04W 28/0205; H04W 28/021; H04W 28/0247; H04W 28/0252; H04W 28/0257; H04W 28/0263; H04W 28/0268
See application file for complete search history.

(56) References Cited

U.S. PATENT DOCUMENTS

| | | | |
|---|---|---|---|
| 2013/0294271 | A1 | 11/2013 | Nagata et al. |
| 2013/0324144 | A1 | 12/2013 | Warken |
| 2014/0016614 | A1 | 1/2014 | Velev et al. |
| 2014/0242970 | A1 | 8/2014 | Yu et al. |
| 2014/0341058 | A1 | 11/2014 | Takano |
| 2015/0036574 | A1 | 2/2015 | Uemura et al. |
| 2015/0215839 | A1* | 7/2015 | Johansson ............. H04W 36/30 455/426.1 |
| 2015/0282175 | A1* | 10/2015 | Dai ....................... H04W 28/02 370/329 |
| 2015/0312942 | A1 | 10/2015 | Cui et al. |
| 2016/0014037 | A1 | 1/2016 | Hu et al. |
| 2017/0048746 | A1 | 2/2017 | Rönneke |

FOREIGN PATENT DOCUMENTS

| | | | |
|---|---|---|---|
| EP | 2568758 | A1 | 3/2013 |
| EP | 2911443 | A1 | 8/2015 |
| JP | 2011077896 | A | 4/2011 |
| JP | 2013-529402 | A | 7/2013 |
| JP | 2014-524222 | A | 9/2014 |
| JP | 20122531165 | A | 9/2014 |
| JP | 2015-530838 | A | 10/2015 |
| WO | 2015/056447 | A1 | 4/2015 |

OTHER PUBLICATIONS

Hitachi, "Online Small Data Transfer using NAS", SA WG2 Meeting #86, S2-113043, Jul. 11-15, 2011, 5 pages.
3GPP 3rd Generation Partnership Project: "Technical Specification Group Services and System Aspects; Architecture enhancements for Cellular Internet of Things (Release 13)", 3GPP TR 23.720 V1.2.0, Nov. 2015(Nov. 2015), the whole document, 96 pages.
3GPP 3rd Generation Partnership Project: "Technical Specification Group GSM/EDGE Radio Access Network; Cellular system support for ultra-low complexity and low throughput Internet of Things (CIoT) (Release 13)", 3GPP TR 45.820 V13.1.0, Nov. 2015(Nov. 2015), the whole document, 495 pages.
3GPP 3rd Generation Partnership Project: "Technical Specification Group Services and System Aspects; General Packet Radio Service (GPRS) enhancements for Evolved Universal Terrestrial Radio Access Network (E-UTRAN) access (Release 13)", 3GPP TS 23.401 V13.5.0, Dec. 2015(Dec. 2015), the whole document, 337 pages.
3GPP 3rd Generation Partnership Project: "Technical Specification Group Services and System Aspects; Architecture enhancements to facilitate communications with packet data networks and applications (Release 13)", 3GPP TS 23.682 V13.4.0, Dec. 2015(Dec. 2j015), the whole document, 81 pages.
3GPP 3rd Generation Partnership Project: "Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015(Dec. 2015), the whole document, 507 pages.
3GPP 3rd Generation Partnership Project: "Technical Specification Group Services and System Aspects;Service accessibility (Release 13)", 3GPP TS 22.011 V13.4.0, Dec. 2015(Dec. 2015), the whole document, 28 pages.

3GPP 3rd Generation Partnership Project: "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0, Dec. 2015(Dec. 2015), the whole document, 290 pages.
3GPP 3rd Generation Partnership Project: "Technical Specification Group Radio Access Network; Evolved Universal Terrestrial Radio Access Network (E-UTRAN); S1 Application Protocol (S1AP) (Release 13)", 3GPP TS 36.413 V13.1.0, Dec. 2015(Dec. 2015), the whole document, 314 pages.
International Search Report and Written Opinion dated Aug. 31, 2016 issued in International Application No. PCT/EP2016/064435. (11 pages).
Ericsson: "Small Data overload control", 3GPP Draft; 52-15923_WAS2740-CIOT-SMALL_DATA_OVERLOAD_CONTROL_V2, 3rd Generation Partnership Project (3GPP), Mobile Competence Centre; 650, Route Des Lucioles; F-06921; Sophia-Antipolis Cedex; France; vol. SA WG2, No. Sophia Antipolis, France; Aug. 31, 2015-Sep. 3, 2015; Sep. 3, 2015 (Sep. 3, 2015), XP051034623, 5 pages.
"3rd Generation Partnership Project; Technical Specification Group Services and System Aspects; Study on Machine-Type Communications (MTC) and other mobile data applications communications enhancements (Release 12)", 3GPP TR 23.887 V12.0.0 (Dec. 2013), 151 pages.
"3rd Generation Partnership Project; Technical Specification Group GSM/EDGE Radio Access Network; Cellular System Support for Ultra Low Complexity and Low Throughput Internet of Things; (Release 13)", 3GPP TR 45.820 V1.3.1 (Jun. 2015), 271 pages.
"3rd Generation Partnership Project; Technical Specification Group Services and System Aspects; Architecture enhancements for Cellular Internet of Things; (Release 13)", 3GPP TR 23.720 V0.0.0 (Jul. 2015), 55 pages.
Non-Final Office Action dated Jul. 12, 2017 issued in U.S. Appl. No. 14/826,899 (43 pages).
Final Office Action dated Feb. 27, 2018 issued in U.S. Appl. No. 14/826,899 (48 pages).
3GPP SA WG2 Meeting #116BIS; S2-165431; (Aug. 29-Sep. 2, 2016), Sanya, P.R. China. (1 page).
3GPP SA WG2 Meeting #116B15; S2-165232; (Aug. 29-Sep. 2, 2016), Sanya, P.R. China. (5 pages).
3GPP SA WG2 Meeting #115; S2-162868; (May 23-27, 2016), Nanjing, P.R. China. (14 pages).
3GPP TSG-SA WG2 Meeting #112; S2-154024; (Nov. 16-20, 2015), Anaheim, CA USA. (9 pages).
3GPP TSG SA WG2 Meeting #113; S2-160403; (Jan. 25-30, 2016), Frigate Bay, St. Kitts. (12 pages).
Non-Final Office Action dated Mar. 7, 2019 issued in U.S. Appl. No. 14/826,899 (35 pages).
Office Action issued in IP No. 744382 by the New Zealand Intellectual Property Office dated Dec. 2, 2019 (4 pages).
Japanese Office Action with English Translation issued in corresponding Japanese Application No. 2018-539967, dated Jul. 8, 2019, (10 pages).
English Translation of Japanese Search Report issued in corresponding Japanese Application No. 2018-539967, dated Jun. 25, 2019, (32 pages).
Huawei, "Data over NAS for infrequent small data transmission", SA WG2 Meeting #110, S2-152340, Dubrovnik, Croatia Jul. 6-10, 2015, (6 pages).
Alcatel-Lucent, et al., "Introduction of Control Plane CIoT EPS optimization", 3GPP TSG SA WG2 Meeting #112, S2-154451, Anaheim, USA, Nov. 16-20, 2015, (11 pages).
Final Office Action issued in U.S. Appl. No. 14/826,899 dated Sep. 5, 2019, (44 pages).
Final Rejection dated May 29, 2020 issued in Japanese Patent Appln No. 2018-539967 (with English summary). (5 pages).

* cited by examiner

SYSTEM, METHODS, AND APPARATUSES FOR MANAGING DATA RATE FOR CONTROL PLANE OPTIMIZATION

CROSS REFERENCE TO RELATED APPLICATION

This application is a 35 U.S.C. § 371 National Stage of International Application No. PCT/EP2016/076290, filed Nov. 2, 2016, which claims priority to U.S. Application No. 62/296,952, filed on Feb. 18, 2016. The above identified application are incorporated by reference.

TECHNICAL FIELD

This disclosure relates to a system, methods, and apparatuses for managing data rate for control plane optimization.

BACKGROUND

3GPP is developing narrowband radio technology for facilitating Internet-of-Things (IoT) communication using cellular networks. This development for communication includes data transmission for small quantities of infrequent data, as specified in TS 45.820 and TR 23.720, version 1.2.0. This data may come from user equipments (UEs) that are, for example, low in complexity and power constrained. Such UEs are sometimes referred to as cellular IOT (CIoT) devices (e.g., indoor appliances, sensors, medical devices).

This development further includes the introduction of control plane CIoT EPS optimization, which provides for the transport of user data (a.k.a., "uplink (UL) data") in the evolved packet system (EPS) control plane, as specified in a change request to TR 23.401 (CR 2942, or S2-160403). This may involve the transfer of user data in non-access stratum (NAS) signalling, and may be accomplished by using NAS transport capabilities of radio resource control (RRC) and S1-AP protocols and data transport between the mobility management entity (MME) and serving gateway (SGW) and packet data network gateway (PGW). In this context, a UE may send part of its uplink data in a manner that is encrypted and integrity protected in a NAS message, which may be relayed to the MME. The MME decrypts the uplink (UL) data, and may send the UL data to the PGW via the SGW.

SUMMARY

The present disclosure relates to controlling a data rate of data (e.g., UL data) that is transported in the control plane. For instance, a sensor or other CIoT device may include UL data in a control message (e.g., a NAS message—such a NAS message is referred to as a NAS Data Protocol Data Unit (PDU)) that is transmitted to a MME node in a LTE core network. Sending the UL data in the control plane (e.g., in NAS Data PDU), however, involves potential adverse effects on control signaling that also uses the control plane (e.g., signaling used by other devices in establishing a radio resource control (RRC) connection). Thus, there is a need to limit the amount of data (e.g. UL data) being sent on the control plane. This may include limiting the data rate to, e.g., a maximum bit rate (MBR), aggregated maximum bitrate (AMBR), UE aggregated maximum bitrate (UE-AMBR), or UE control plane aggregated maximum bitrate (UE-CP-AMBR). The data rate needs to be controlled for UL data from the UE and being relayed by the network (e.g. MME node, SCEF, SGW, or PGW), and also for DL data being relayed by the network to the UE. The DL data may be relayed by a SCEF node (which is described in TS 23.682, CR 0154, S2-160423 and S2-154024) toward a WCD. The DL data may have to pass through the MME node, and more specifically may use the control plane for transport. This transmission of DL data thus still competes with radio resources that could be used for control signaling. Thus, there are advantages to controlling data rate for both UL and DL data for CIoT and other UEs.

This disclosure more specifically addresses UL data rate control between a MME node and a UE, which are end points of the control plane, and addresses DL data rate control between the MME node and a service capability exposure function (SCEF) node, which are endpoints of the T6a interface.

For UL data rate control, the MME node may attempt to throttle (or otherwise control) the amount or frequency of UL data that a UE transmits in the control plane, such as by communicating to the UE rate control information (e.g., a throttling factor or throttling delay). For instance, the MME may throttle NAS messages with user data (i.e., NAS Data PDUs) sent using control plane CIoT EPS optimization by accepting a NAS message and adding a throttling factor and/or a throttling delay in a NAS message sent to the UE. The UE shall follow the throttling factor and/or throttling delay sent by the MME until the throttling has been omitted in the next NAS message from the network, or the throttling delay time has expired. As an example, the UE may refrain from sending any subsequent NAS message with user data using control plane CIoT EPS optimization until a criterion (e.g., throttling delay) is fulfilled. As another example, the UE may reduce the amount of user data that it sends in subsequent NAS messages, where the reduction amount is specified by the throttling factor (e.g., as a percentage of the UL data being transmitted in the control plane during normal operation).

The UE may resume normal operation when the throttling delay has expired, or when the MME node communicates a subsequent control message (e.g., NAS message) in which the throttling factor and throttling delay are omitted. Alternatively, the MME node may also provide a new throttling factor or throttling delay in a subsequent control message. The last received value of the throttling factor and throttling delay supersedes any previous values received from that MME node. The reception of a throttling delay may restart the UE throttling delay timer.

According to one aspect of the present disclosure, a method and MME node is presented for managing signaling congestion. The method comprises the MME node receiving (e.g., accepting) a first control plane message (e.g., a non-access stratum (NAS) message, such as a NAS attach request message) transmitted by the WCD, the first control plane message including uplink (UL) data (e.g., user plane data) intended for relay by the MME node to another device. After receiving the first control message, the MME node creates a second control message (e.g., a NAS attach accept message), the second control plane message identifying at least one of: i) a throttling factor that indicates a level by which the WCD should reduce the amount of UL data in any future control plane message to the MME node, and ii) a throttling delay that indicates how much time the WCD should wait before including any UL data in any future control plane message to the MME. The MME node then transmits the second control plane message including the at least one of the throttling factor and the throttling delay, the second control plane message intended for the WCD.

According to one aspect of the present disclosure, a method and WCD is presented for managing signaling congestion. In the method, the WCD transmits a first control plane message which includes uplink (UL) data intended for relay by a mobility management entity (MME) node to another device, the first control plane message intended for the MME node. The WCD receives a second control plane message transmitted from a mobility management entity (MME) node, the second control plane message including at least one of: i) a throttling factor that indicates a level by which the WCD should reduce the amount of UL data in any future control plane message to the MME node and ii) a throttling delay that indicates how much time the WCD should wait before including any UL data in any future control plane message to the base station or to the MME. After receiving the second control plane message, the WCD transmits a third control plane message with an amount of UL data (e.g., zero amount of UL data) based on the throttling factor, or with zero amount of UL data if the a timer set based on the throttling delay has not yet expired, the third control plane message intended for the MME node.

For DL data rate control, a MME node can limit the number or frequency of data delivery requests directed toward it. The MME node can reject NIDD Submit Request messages or to further offload the MME, the MME can request the SCEFs to selectively reduce the number of NIDD Submit Requests it sends for downlink traffic according to a throttling factor and for a throttling delay specified in the NIDD Submit Downlink Ack message (or NIDD Submit Ack message). See TS 23.682 for corresponding SCEF logic. The SCEF shall not send any subsequent NIDD Submit Request messages with user data until its throttling delay timer has expired. The SCEF resumes normal operations at the expiry of the throttling delay. The last received value of the throttling factor and throttling delay supersedes any previous values received from the MME. The reception of a throttling delay restarts the SCEF throttling delay timer. In an alternative embodiment, the SCEF resumes normal operation when it receives a subsequent NIDD Submit Downlink Ack message (or NIDD Submit Ack message) from the network where the throttling factor and throttling delay has been omitted.

According to an aspect of the present disclosure, a method and MME node is presented for interacting with a service capability exposure function (SCEF) node and to one or more wireless communication devices (WCDs). The method comprises the MME node determining whether one or more throttling criteria have been met (e.g., whether congestion of control signaling between the MME node and the one or more WCDs has deteriorated past a predetermined threshold). In response to determining that the one or more throttling criteria have been met (e.g., congestion of control signaling has deteriorated past the predetermined threshold): the MME node creating a first data delivery message (e.g., MT NIDD response or NIDD submit downlink ack message) that includes at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node. The MME node transmitting the first data delivery message including the at least one of the throttling factor and the throttling delay, the first data delivery message intended for the SCEF node.

According to an aspect of the present disclosure, a SCEF is presented for managing congestion. In the method, the SCEF receives a first data delivery message (e.g., NIDD submission ack message or MT NIDD response message) transmitted by a mobility management entity (MME) node, the first data delivery message including at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node. After receiving the second control plane message, the SCEF reducing the number of data delivery requests transmitted to the MME node based on the throttling factor, or refraining from transmitting any data delivery request to the MME node if a timer based on the throttling delay has not yet expired.

Further, the MME can request a base station (e.g., eNB) to reject new RRC connection requests from UEs that access the network to send user data via the Control Plane for normal priority and/or exception reporting.

In another aspect, there is provided a rate control method performed by an MME. In one embodiment, the method includes the MME receiving an UL NAS message (e.g., attach request) transmitted by a WCD. The method further includes the MME, after receiving the UL NAS message, generating a DL NAS message and transmitting the DL NAS message towards the WCD. The DL NAS message transmitted by the MME comprises information indicating a number of UL NAS messages containing user data that the WCD is permitted send to the MME within a certain time period. In some embodiments, the number of UL NAS messages indicated by the information included in the DL NAS message is zero. In some embodiments, the DL NAS message transmitted by the MME comprises information indicating the certain time period. In some embodiments, the UL NAS message transmitted by the WCD comprises user data, and the method further comprises the MME forwarding the user data to another device. In some embodiments, the method further includes the MME receiving a second UL NAS message transmitted by the WCD, wherein the second UL NAS message comprises user data intended for another device; and the MME discarding the user data such that the MME does not forward the user data to the another device.

In another aspect, there is provided a method for CN overload control. In one embodiment, the method includes a network node (e.g., MME) determining that a load has reached a threshold. The method further includes, after determining that the load has reached the threshold, the network node transmitting to a base station an Overload Start message comprising information for configuring the base station such that the base station rejects a request transmitted by a WCD for data transfer via control plane CIoT EPS Optimization.

In another aspect, there is provided a method for CN overload control. In one embodiment, the method includes a base station receiving from a network node (e.g., MME) an Overload Start message comprising information indicating that the base station may reject a request for data transfer via control plane CIoT EPS Optimization. The method further includes, after receiving the Overload Start message, the base station receiving from a WCD a request for data transfer via control plane CIoT EPS Optimization. The method further includes, in response to receiving the request transmitted by the WCD, the base station rejecting the request.

These and other aspects and embodiments are further described herein.

DETAILED DESCRIPTION

Figure 1:
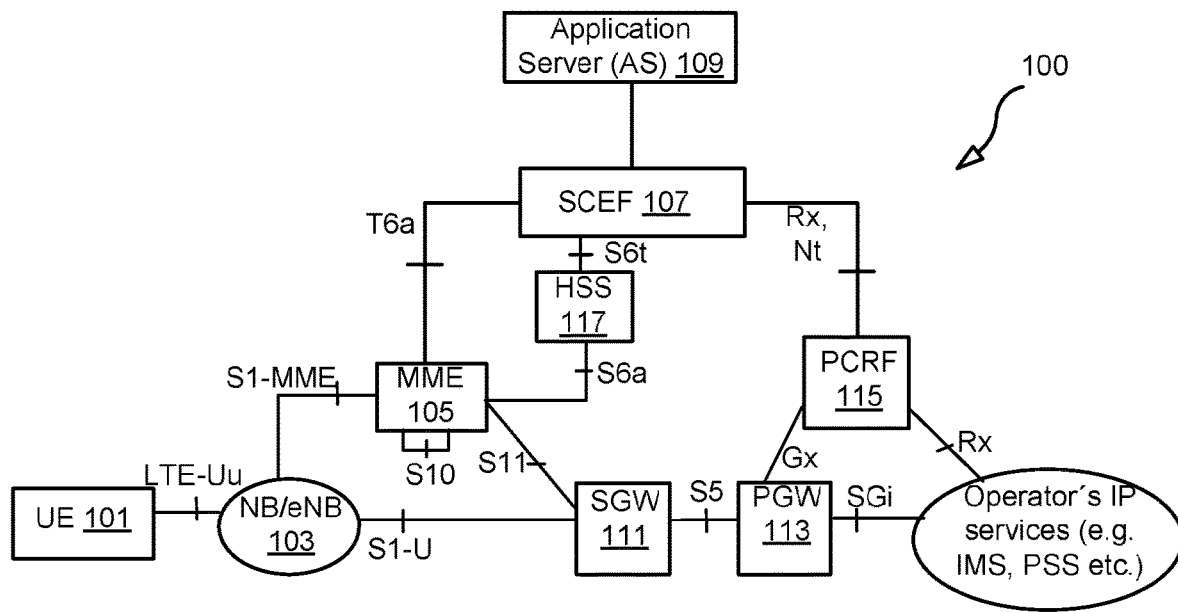
FIGS. 1-2 illustrate an example system according to an aspect of the present disclosure.

FIG. 1 illustrates an example system 100 for managing congestion and managing UL and DL data that may be transmitted in a control plane. The system 100 includes one or more wireless communication devices (WCDs), such as user equipment (UE) 101. It further includes a base station, such as NB/eNB 103, a mobility management entity (MME) node 105, a service capability exposure function (SCEF) node 107, a serving gateway (SGW) 111, a PDN gateway (PGW) 113, a PCRF 115, a HSS 117, and an application server 109.

In some cases, the UE may be a cellular Internet of Things (CIoT) device, such as a sensor or appliance. Compared to a UE such as a smartphone, a sensor or appliance may transmit (e.g., broadcast) much less UL data and do so much less frequently. Under some circumstances, it may be more efficient to transmit such UL data in the control plane rather than in the user plane. The control plane may include, for example, the non-access stratum (NAS) layer used by the UE 101 and the MME 105 to communicate with each other. The data may include UL data transmitted by the UE 101 for another device (e.g., application server 109) or DL data transmitted by another device (e.g., AS 109) for UE 101. The data, in some situations, are transported using non-IP data delivery (NIDD), as specified in TS 23.682 (see change request 0154, or S2-160423). The SCEF node 107, which is also described in TS 23.682, may facilitate delivery of non-IP data.

Figure 2:
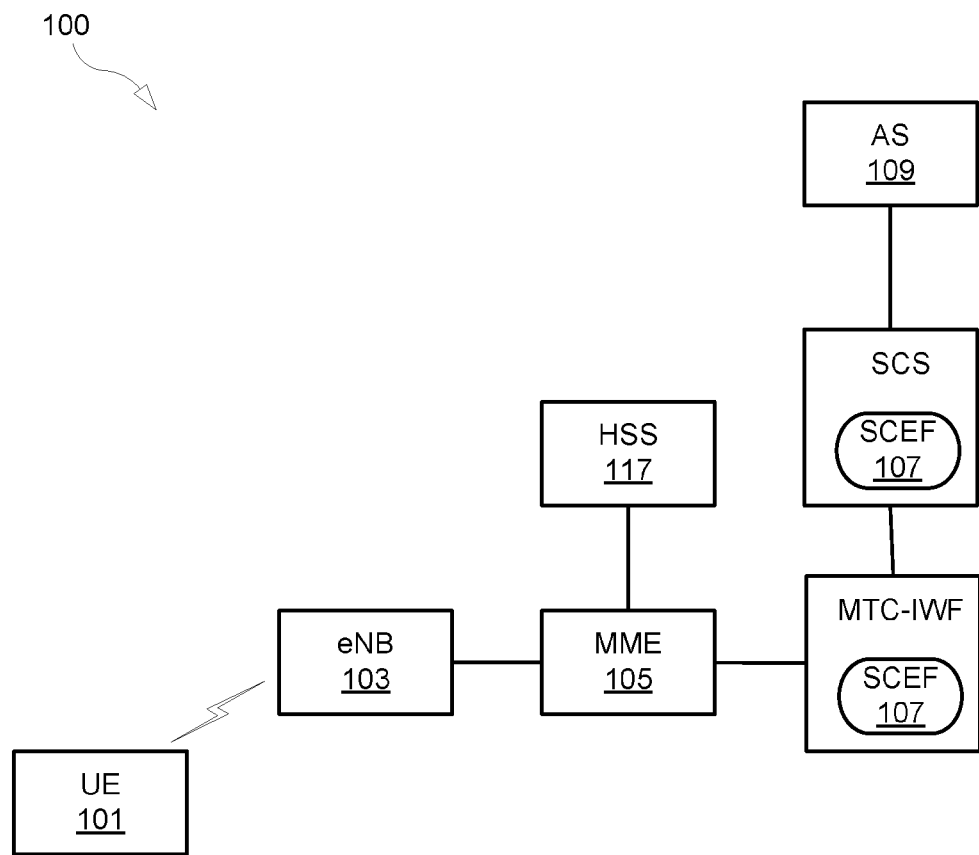

FIG. 2 illustrates a more specific example of system 100. In this example, the SCEF node 107 may be part of a services capability server (SCS) and/or a machine-type communication (MTC) Interworking function (MTC-IWF) node. In other instances, the SCEF node 107 may be a standalone component. The SCEF node 107 may be located at an edge of the core network and act as a gateway to devices outside the core network. Additionally, while FIG. 1 and FIG. 2 show a MME node 105, the functionality and steps performed in the MME node 105 may in some embodiments be performed in a CIoT service gateway node (C-SGN), either in addition to or as an alternative to the MME node 105.

As discussed above, UL and DL data for a UE that is a CIoT device may be more efficiently transmitted in the control plane between the UE 101 and MME 105, and via NIDD between the MME 105 and the application server 109 or other source or destination of the data. The control plane may have a limited amount of transmission resources, such as radio transmission resources (e.g., frequency and time resources) used by the UE 101 and eNB/NB 103 to wirelessly exchange information. The transport of the UL and DL data in the control plane may compete with control signaling for such transmission resources. As a result, it may significantly interfere with control signaling between the MME 105 and the UE 101, and/or between the eNB/NB 103 and the UE 101.

Thus, methods are needed to perform rate control for UL data that the UE may attempt to send in the control plane and for DL data that may be intended to be sent to the UE in the control plane.

UL Data Rate Control

For performing rate control for UL data, the MME may throttle NAS messages with user data (i.e., NAS Data PDUs) sent using Control Plane CIoT EPS optimization (e.g., the MME may send a message to a UE indicating a time period (a.k.a., "throttling delay") and indicating (implicitly or expressly) a number of NAS Data PDUs that the UE is permitted to send during the indicated time period) by, for example, accepting the NAS message and adding a throttling factor and/or a throttling delay in a NAS message sent to the UE. The UE shall follow the throttling factor and throttling delay sent by the MME until the throttling has been omitted in the next NAS message from the network, or the throttling delay time has expired. (That is, for example, the UE shall not send any subsequent NAS messages with user data sent using Control Plane CIoT EPS optimization until that criterion is fulfilled.)

The UE may resume normal operations at the expiry of the throttling delay. The last received value of the throttling factor and throttling delay supersedes any previous values received from that MME. The reception of a throttling delay restarts the UE throttling delay timer. In an alternative embodiment, the UE resumes normal operation when the UE receives a subsequent NAS message from the network where the throttling factor and throttling delay has been omitted. The detection of NAS level congestion is discussed in more detail in section 4.3.7.4.2.1 of TS 23.401, and is reproduced later in the disclosure.

Figure 3:
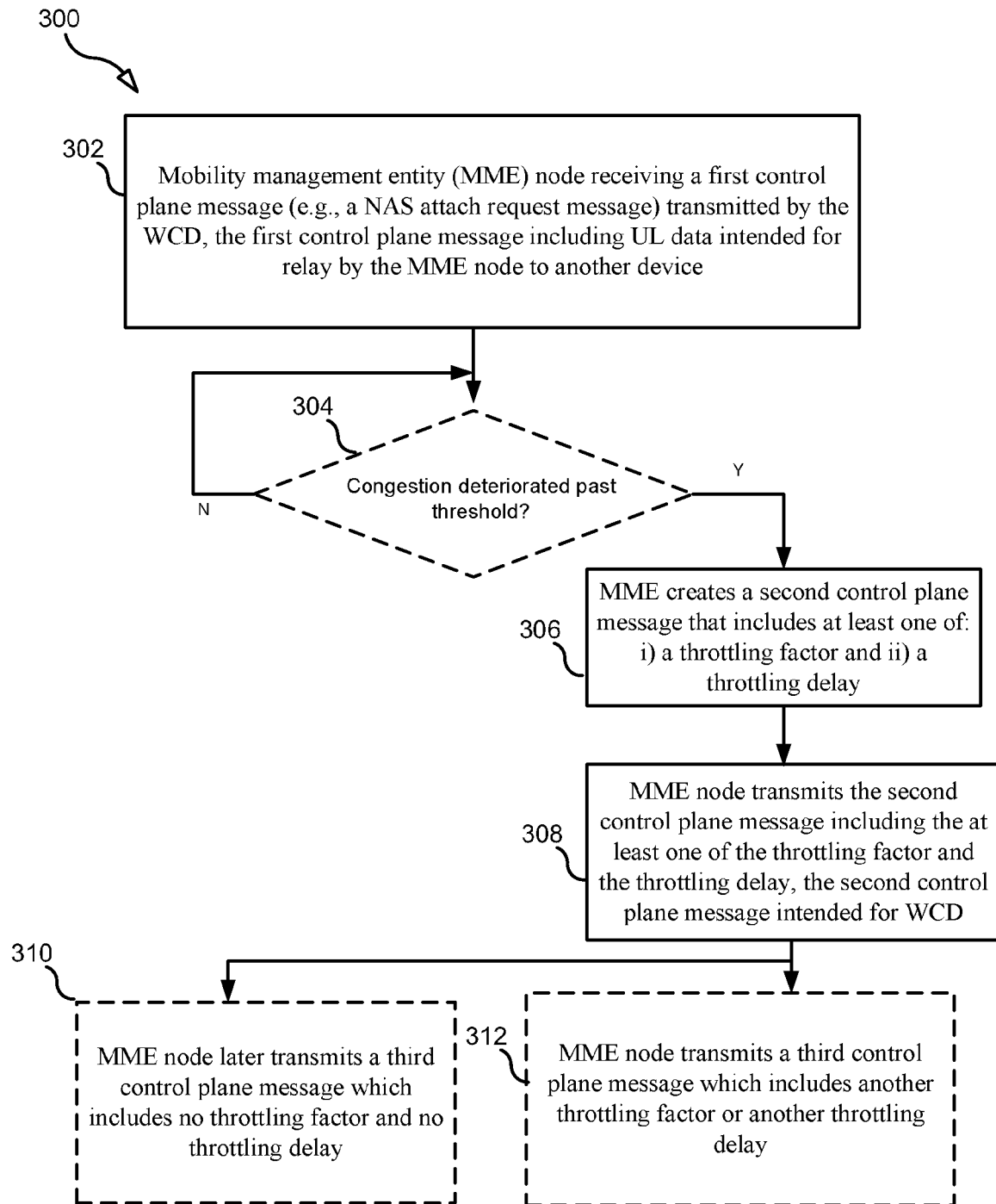
FIGS. 3-11 provide flow diagrams and signaling diagrams that illustrates aspects of the present disclosure.
Figure 4:
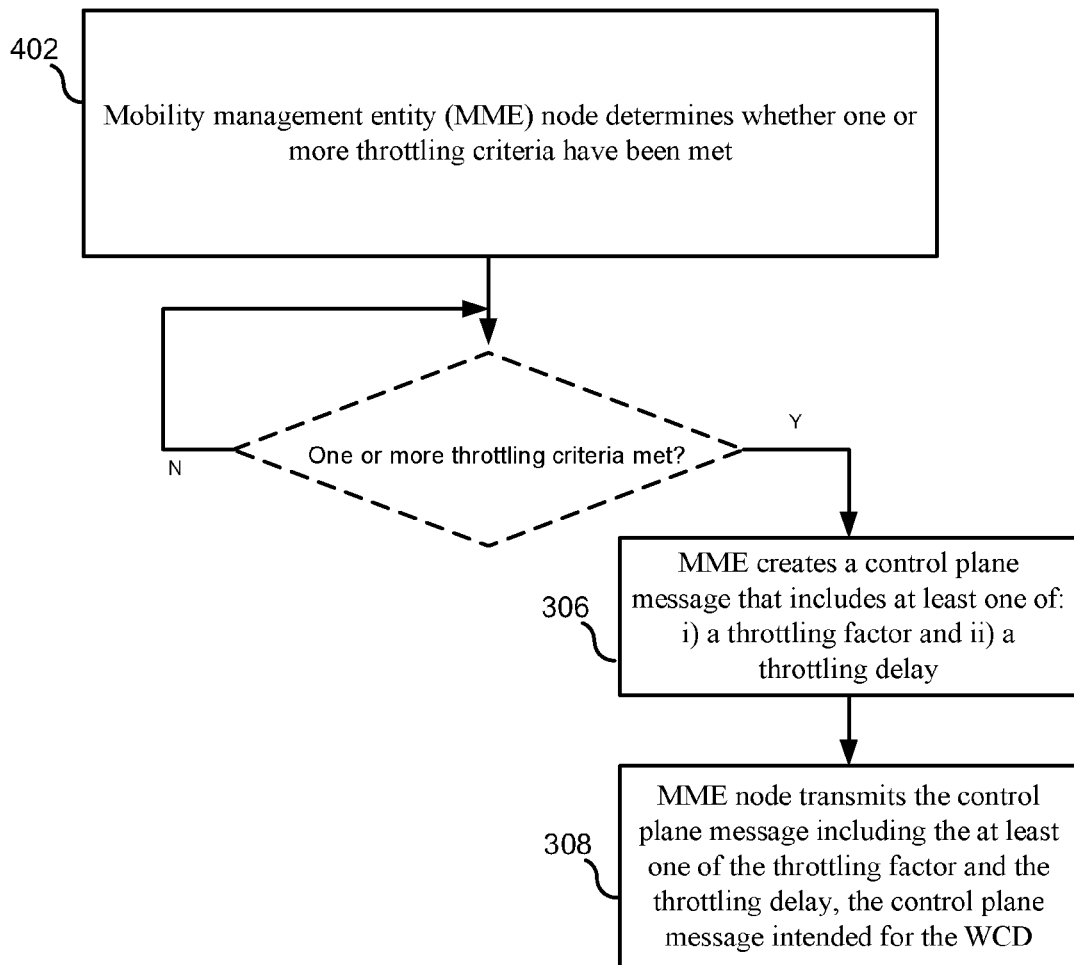

FIGS. 3 and 4 provide flow diagrams that also illustrate coordination between a MME node (e.g., MME node 105) and a wireless communication device (e.g., UE 101) for limiting UL data rate and managing signalling congestion between the MME node and the UE.

In an embodiment, the process 300 in FIG. 3 may begin in step 302, in which the MME node receives (e.g., accepting) a first control plane message (e.g., a non-access stratum (NAS) message, such as a NAS attach request message) transmitted by the WCD, the first control plane message including uplink (UL) data (e.g., user plane data) intended for relay by the MME node to another device. Examples of the control plane message include a NAS message that contains Control Plane CIoT Optimization data (or "small data") (e.g. "NIDD Delivery" message). Other examples, depending on protocol layer, are "S1-AP Initial UE Message (NAS Data PDU with EBI)" or "Uplink S1-AP msg (NAS Data PDU with EBI)".

In step 306, after receiving the first control message, the MME node may create a second control message (e.g., a NAS attach accept message), the second control plane message identifying at least one of: i) a throttling factor that indicates a level by which the WCD should reduce the amount of UL data in any future control plane message to the MME node, and ii) a throttling delay that indicates how much time the WCD should wait before including any UL data in any future control plane message to the MME (i.e., the second control plane message may indicate a time period (i.e., "throttling delay") (e.g., 0.5 deci hours) and a number of NAS Data PDUs that the UE is permitted to send during the indicated time period, wherein, in this example, the number is zero).

In step 308, MME node transmits the second control plane message including the at least one of the throttling factor and the throttling delay, the second control plane message intended for the WCD. For instance, the MME node may transmit the second control plane message toward the WCD, via a base station between the two nodes. Examples of this message include a Downlink S1-AP message with a DL NAS message that includes the throttling factor and throttling delay.

FIG. 3 further illustrates an optional step 304 for process 300. In step 304, the MME node may determine in step 304 whether congestion of control signaling between the MME node and the WCD has deteriorated past a predetermined threshold. In this example, step 306 may be performed in response to both receiving first control plane message from the WCD and determining that congestion has deteriorated past the predetermined threshold.

In some cases, the received control plane message (e.g., NAS message) may be processed (i.e. forwarded UL data or be discarded). Throttling can also be initiated at a later stage when congestion/overload has been detected (but before the signaling connection with the UE is released). Immediate initiation of the throttling may be done if the congestion/overload has already been detected in the MME when the UL NAS message is received In some instances, the MME node may initiate the throttling process immediately after receiving a control plane message (e.g., in step 302) transmitted by the WCD. In some instances, it may do so without first receiving a control plane message from the WCD, and may instead initiate the throttling criteria based on some other throttling criterion or criteria, such as a result of overload/congestion, and/or as a result of that the UE has exceeded its small data quota, subscribed maximum bitrate, subscribed maximum bitrate for the Control Plane, exceeded Service Level Agreement etc. In some instances, a combination of these criteria may need to be satisfied (e.g., the MME node has to receive a control plane message and detect control signaling congestion, and/or detect that the WCD has exceeded a maximum UL bit rate or quota) before the MME node will initiate the throttling process.

In some instances, the MME node may determine whether the WCD has exceeded a predetermined maximum data quota or maximum data rate (e.g., subscribed maximum bit rate, subscribed UE aggregated maximum bit rate for the CP or totally for the UE), wherein the step of transmitting the second control plane message including the throttling factor or the throttling delay is performed in response to receiving first control plane message from the WCD and determining that the WCD has exceeded a predetermined maximum data quota or maximum data rate.

More generally speaking, the receipt of the first control plane message with the uplink data in step 302, the deterioration of congestion past a threshold, and/or the exceeding of the maximum bit rate (e.g., maximum UL bit rate) may be examples of throttling criteria. The MME node may thus trigger throttling when one or more of the throttling criteria are met. This is illustrated in a process in FIG. 4, in which the MME node, in step 402, determines whether one or more throttling criteria have been met. The MME node in this embodiment may transmit the second control plane message that includes the throttling factor or throttling delay in step 308 without first waiting to receive a control plane message with UL data from the WCD. In that instance, the throttling may be triggered by deterioration of signaling congestion at the MME node and/or the WCD exceeding a maximum bit rate or UL data quota.

The throttling factor or throttling delay transmitted in step 308 may be overridden. FIG. 3 illustrates the overriding feature with step 312, in which, after transmitting the second control plane message, the MME node transmits a third control plane message which includes another throttling factor or another throttling delay, wherein the other throttling delay overrides the throttling delay in the second control plane message and the other throttling factor overrides the throttling factor in the second control plane message.

As discussed above, the UE may stop the throttling when a timer set by a throttling delay (if transmitted) expires, or when the UE receives a subsequent control plane message that the throttling can cease. In step 312, for example, after transmitting the second control plane message, for instance, the MME node may transmit a third control plane message which includes no throttling factor and no throttling delay, wherein the omission of the throttling factor and the throttling delay is an indication that the one or more WCDs can stop throttling UL data in control plane messages.

In some cases, the throttling factor may indicate that the WCD should include no UL data in any future control plane message to the MME node until the MME node indicates stopping of throttling. In some cases, the throttling factor may indicate a percentage (e.g., 25, 50, 100%) by which the WCD should reduce UL data transmission in the control plane.

In some instances, the MME node determines a maximum bit rate (MBR) at which to limit UL data in the control plane between the MME node and one or more WCDs attached to the MME node. The MME may determine the throttling factor or the throttling delay based on the determined MBR.

Figure 5:
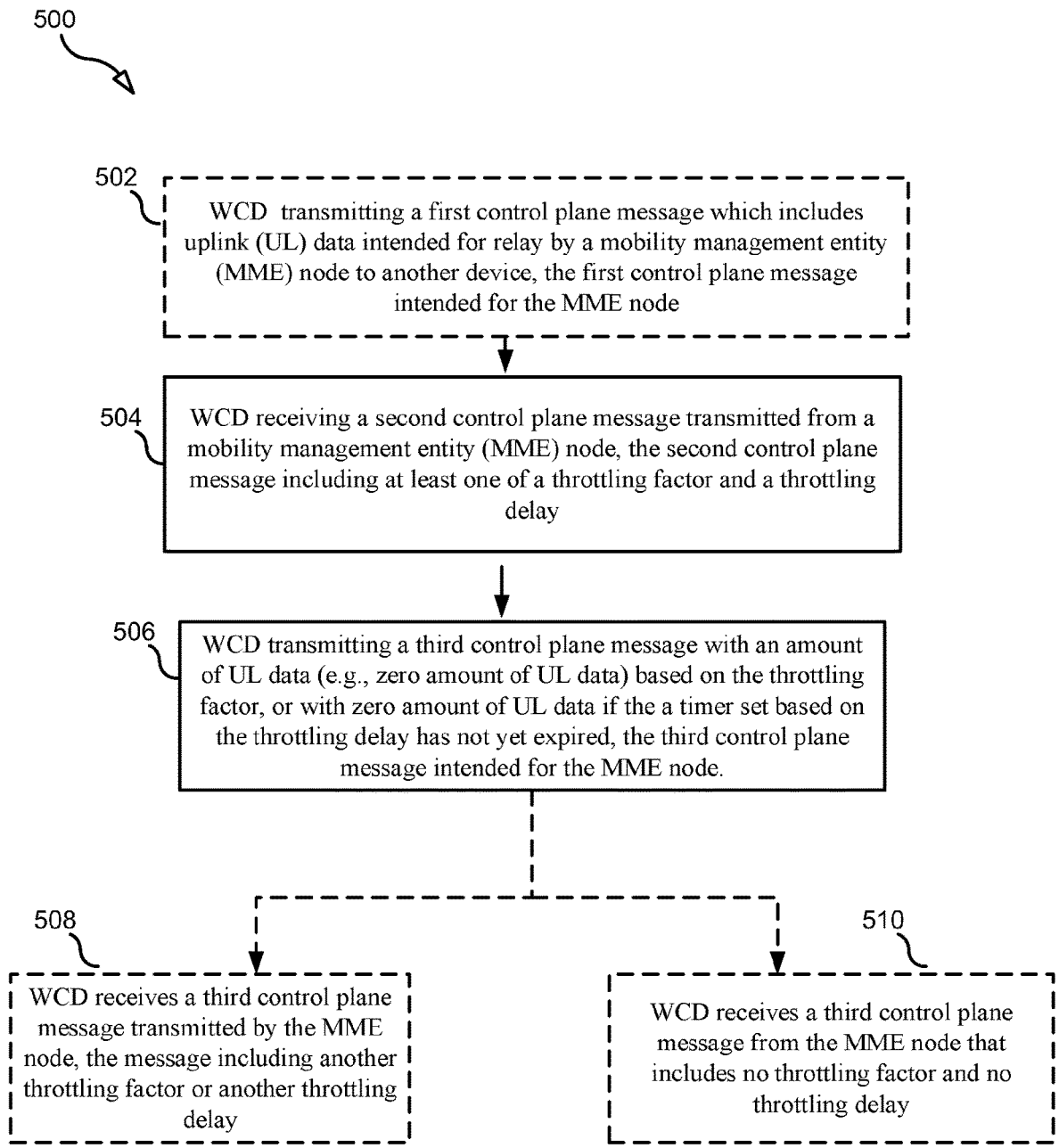

FIG. 5 illustrates data rate control from the perspective of the WCD. The process 500 illustrated in FIG. 5 may, in one embodiment, begin at step 502, in which the WCD transmits a first control plane message which includes uplink (UL) data intended for relay by a mobility management entity (MME) node to another device, the first control plane message intended for the MME node. For instance, the WCD may transmit the control plane message toward the MME node, via a base station between the two nodes.

In step 504, the WCD receives a second control plane message transmitted from a mobility management entity (MME) node, the second control plane message including at least one of: i) a throttling factor that indicates a level by which the WCD should reduce the amount of UL data in any future control plane message to the MME node and ii) a throttling delay that indicates how much time the WCD should wait before including any UL data in any future control plane message to the base station or to the MME.

In step 506, after receiving the second control plane message, the WCD transmits a third control plane message with an amount of UL data (e.g., zero amount of UL data) based on the throttling factor, or with zero amount of UL data if the a timer set based on the throttling delay has not yet expired, the third control plane message intended for the MME node. This step may be part of the WCD's efforts to throttle its transmission of UL data in the control plane.

In an embodiment, the WCD may receive, in step 508, a third control plane message transmitted by the MME node that includes another throttling factor or another throttling delay which overrides those in the earlier control plane message.

In an embodiment, the WCD may receive, in step 510, a third control plane message which includes no throttling factor and no throttling delay. The WCD may identify this as an indication that it can stop throttling of UL data in the control plane.

Figure 6:
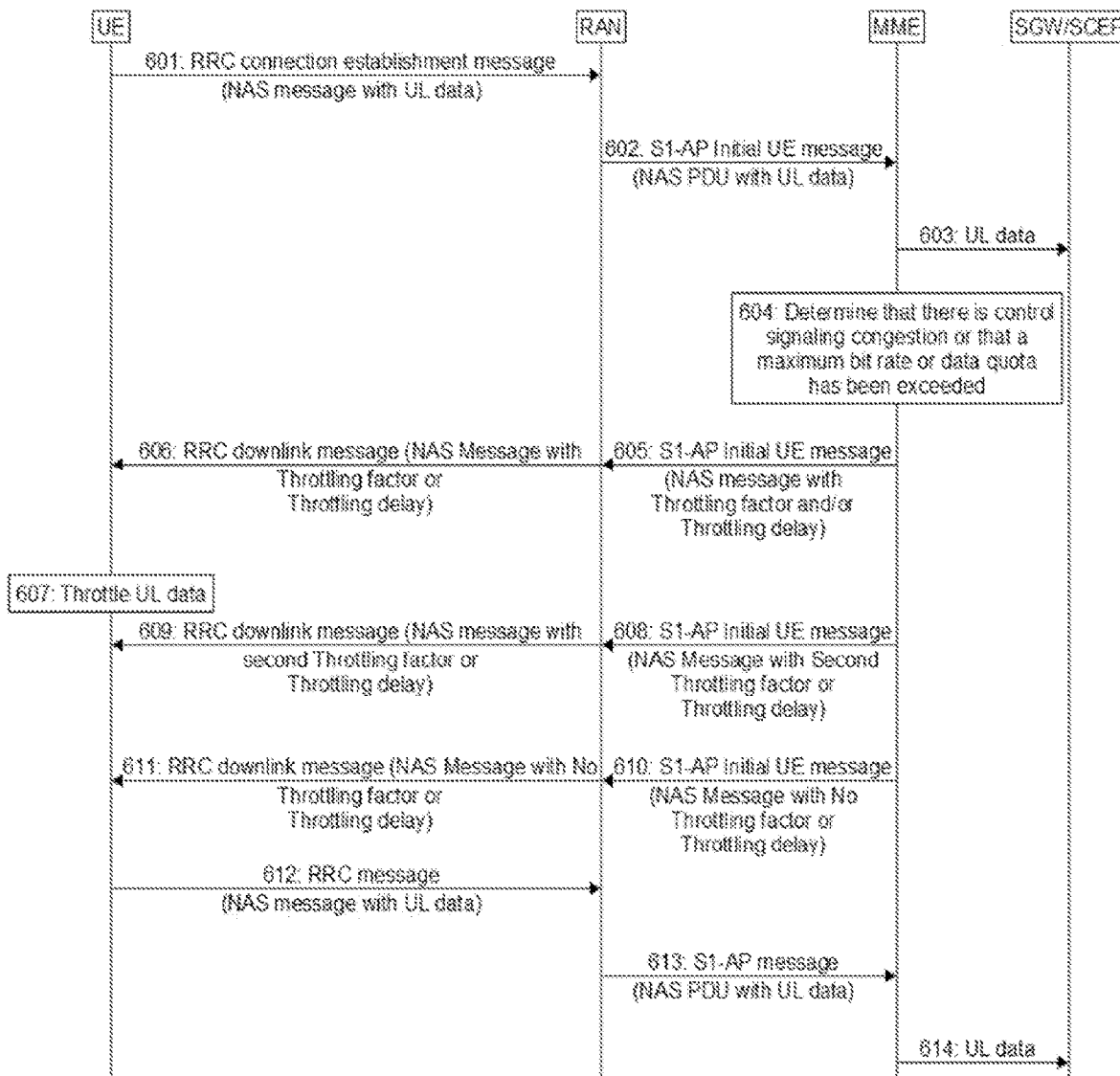

FIG. 6 provides a signaling diagram of the UL data rate control. Messages 601 and 602 show that the control plane message can be a NAS message (e.g., NAS attach request message, as discussed in section 9.8 of TS 24.301 included as a payload in a RRC message between a UE and a base station, and as a payload in a S1-AP message between the base station and the MME node. In the illustrated embodiment, the MME node may initiate throttling after determining in step 604 that there is control signaling congestion. It may transmit a NAS message using messages 605 and 606 to convey a throttling factor or throttling delay to the UE, which throttles UL data in step 607. The MME node may further transmit messages 608 and 609 to modify the throttling, or messages 610 and 611 to stop the throttling. After the throttling is stopped, the UE may resume normal transmission of UL data to the MME node in a control plane (e.g., in the NAS layer).

DL Data Rate Control

DL data rate control may involve the MME rejecting data delivery requests (e.g., MT NIDD delivery request or NIDD submission request). Such requests may include DL data that may need to be relayed to a WCD in the control plane. Because this DL data may compete with control signaling for radio transmission resources, the DL data may be throttled. The MME node may itself receive and reject individual data delivery requests, or it may offload some of that gateway functionality to the SCEF node. For instance, the MME can reject NIDD Submit Request messages or to further offload the MME, the MME can request the SCEFs to selectively reduce the number of NIDD Submit Requests it sends for downlink traffic according to a throttling factor and for a throttling delay specified in the NIDD Submit Downlink Ack message (or NIDD Submit Ack message). See TS 23.682 for corresponding SCEF logic.

The SCEF shall not send any subsequent NIDD Submit Request messages with user data until its throttling delay timer has expired. The SCEF resumes normal operations at the expiry of the throttling delay. The last received value of the throttling factor and throttling delay supersedes any previous values received from the MME. The reception of a throttling delay restarts the SCEF throttling delay timer. In an alternative embodiment, the SCEF resumes normal operation when it receives a subsequent NIDD Submit Downlink Ack message (or NIDD Submit Ack message) from the network where the throttling factor and throttling delay has been omitted. In some instances, the MME node may also restrict signaling node that its SGW may generate, by throttling downlink data notification requests from the SGW. Throttling downlink data notification requests from the SGW is discussed in TS 23.401, section 4.3.7.4.1a, which is also reproduced below.

Figure 7:
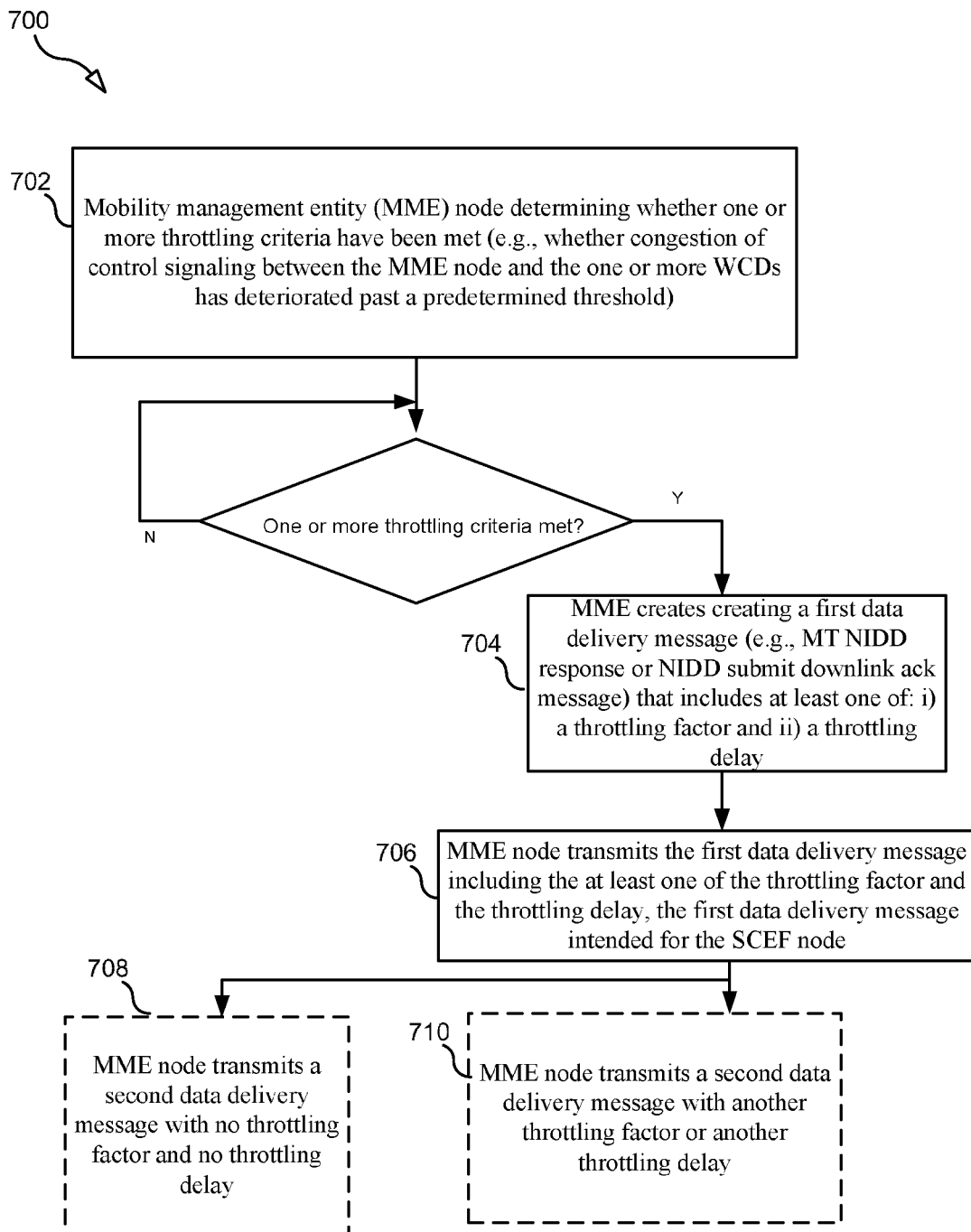

FIG. 7 illustrates another example of DL data rate control. In the process 700 illustrated in FIG. 7, the MME node may, in step 702, determine whether one or more throttling criteria have been met. The one or more criteria may include, for instance, receipt of a data delivery request message (e.g., MT NIDD delivery request or NIDD submission request) transmitted by the SCEF node, congestion of control signaling between the MME node and one or more WCDs has deteriorated past a predetermined threshold, and/or the one or more WCDs exceeding a maximum bit rate (e.g., a maximum DL bit rate) or DL data quota (which may be predetermined values set by a network operator, or may be dynamically determined).

In step 704, in response to a determination that the one or more throttling criteria have been met, the MME node may create a first data delivery message (e.g., MT NIDD response or NIDD submit downlink ack message) that includes at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node. In some cases, the throttling factor or the throttling delay may be based on a determined maximum bit rate at which the MME node is attempting to limit for one or more WCDs.

In step 706, the MME node may transmit the first data delivery message including the at least one of the throttling factor and the throttling delay, the first data delivery message intended for the SCEF node. FIG. 7 further illustrates steps 708 and 710 for modifying the throttling and stopping the throttling, respectively.

In some cases, the MME node may send the throttling factor or throttling delay in an empty NIDD response message or as a new message that is created for the purpose of DL data control between the MME node and the SCEF node. Note that if the throttling criteria does not involve the MME node first receiving a NIDD request message (e.g., MT NIDD request message or NIDD submit request message) from the SCEF node, then the throttling indication from the MME node may be sent to the SCEF node in an unsolicited manner.

Figure 8:
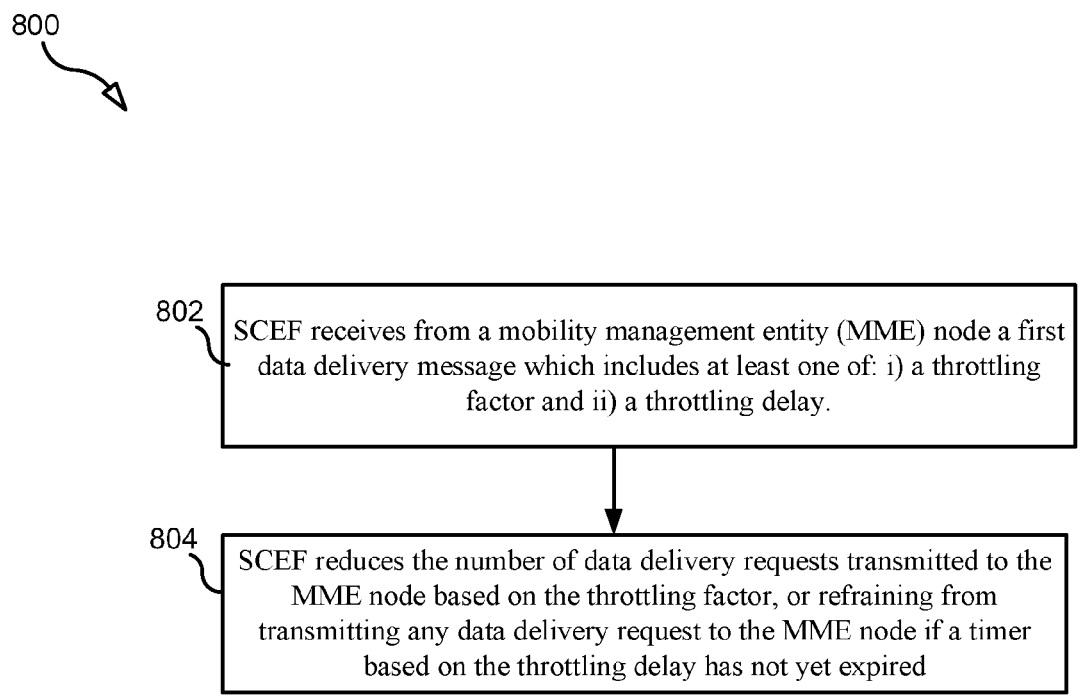

FIG. 8 illustrates the DL data rate control from the perspective of the SCEF node. In step 802, the SCEF node receives a first data delivery message (e.g., NIDD submission ack message or MT NIDD response message) transmitted by a mobility management entity (MME) node, the first data delivery message including at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node.

In step 804, after receiving the second control plane message, the SCEF reduces the number of data delivery requests transmitted to the MME node based on the throttling factor, or refraining from transmitting any data delivery request to the MME node if a timer based on the throttling delay has not yet expired.

In an embodiment, the SCEF node may receive subsequent data delivery messages from the MME node that modifies the throttling or indicates that the throttling can cease.

Figure 9:
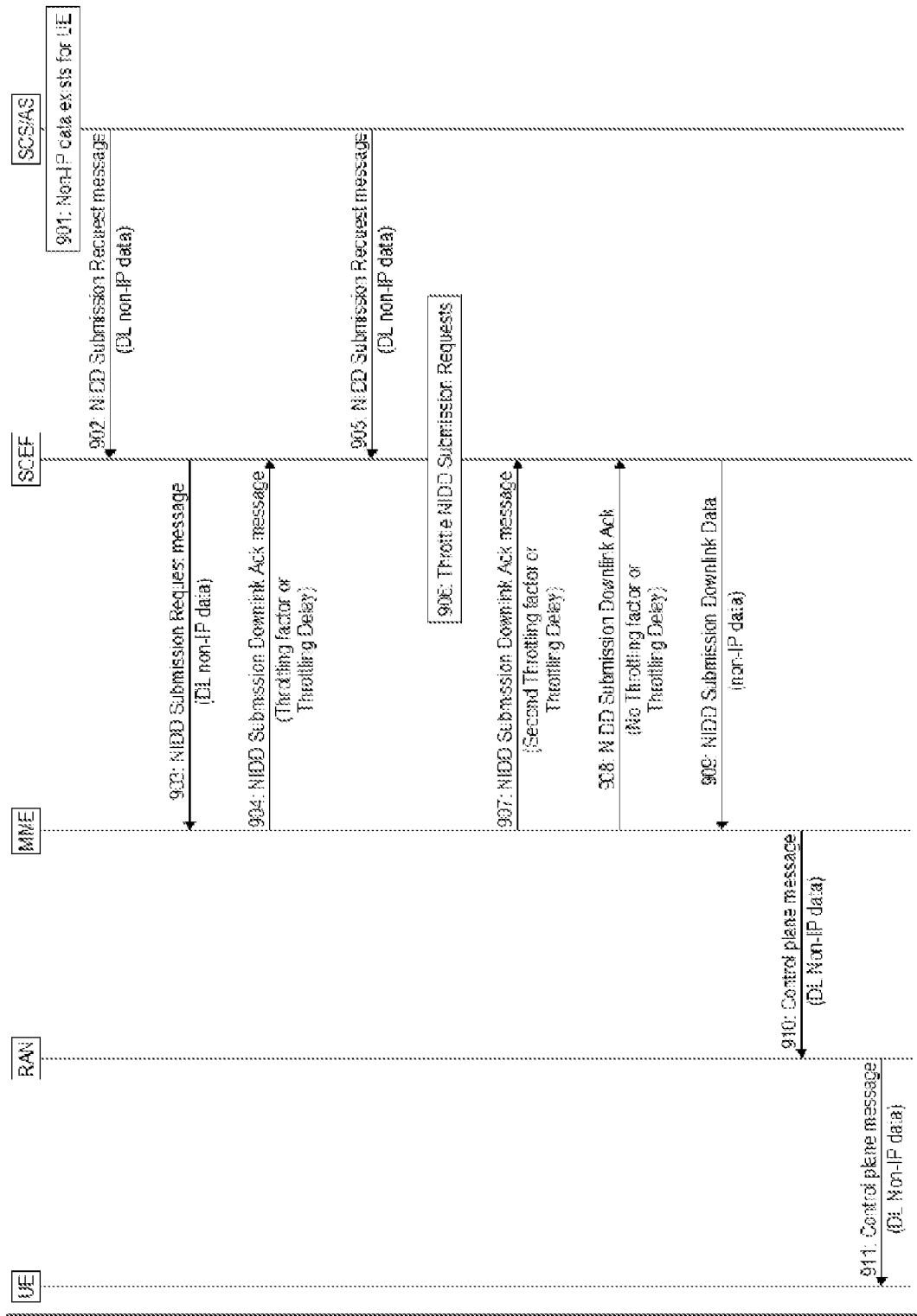

The DL rate control is also illustrated in the signal diagram in FIG. 9. In this particular example, the throttling may be initiated after the MME node receives a NIDD submission request message 903 that includes DL non-IP data. The non-IP data may originate from, for example a services capability server (SCS) and/or an application server (AS), which determines in step 901 that non-IP data exists and transmits a NIDD submission request message 902 to the SCEF node.

To initiate throttling, the MME node may transmit a NIDD submission downlink ack message 904 with a throttling factor or throttling delay to the SCEF node. This causes the SCEF node, even after receiving non-IP data in step 905, to throttle NIDD submission request messages in step 906. The throttling may be modified in message 907, and may be stopped by the MME node in step 908. After the throttling is stopped, the SCEF node may continue to forward NIDD submission request to the MME node, which may then relay the DL data toward the UE in the user plane or the data plane.

Coordination Between MME Node and Base Station

Rate control (e.g., UL data rate control) may also involve the MME node coordinating with a base station to limit network access (e.g., RAN access) if that access may involve transmission of excessive UL in the control plane. This coordination allows a MME node to make a request to a base station for all UEs that are camped on a base station and using the control plane to transport data. In one example, the MME node may use an Overload Start message, which is discussed in TS 23.401, at section 4.3.7.4.1, which is also reproduced below. In the example, the MME node may use the Overload Start message to request an eNB to reject new RRC connection requests from UEs that access the network to send user data via the Control Plane for normal priority and/or exception reporting.

Figure 10:
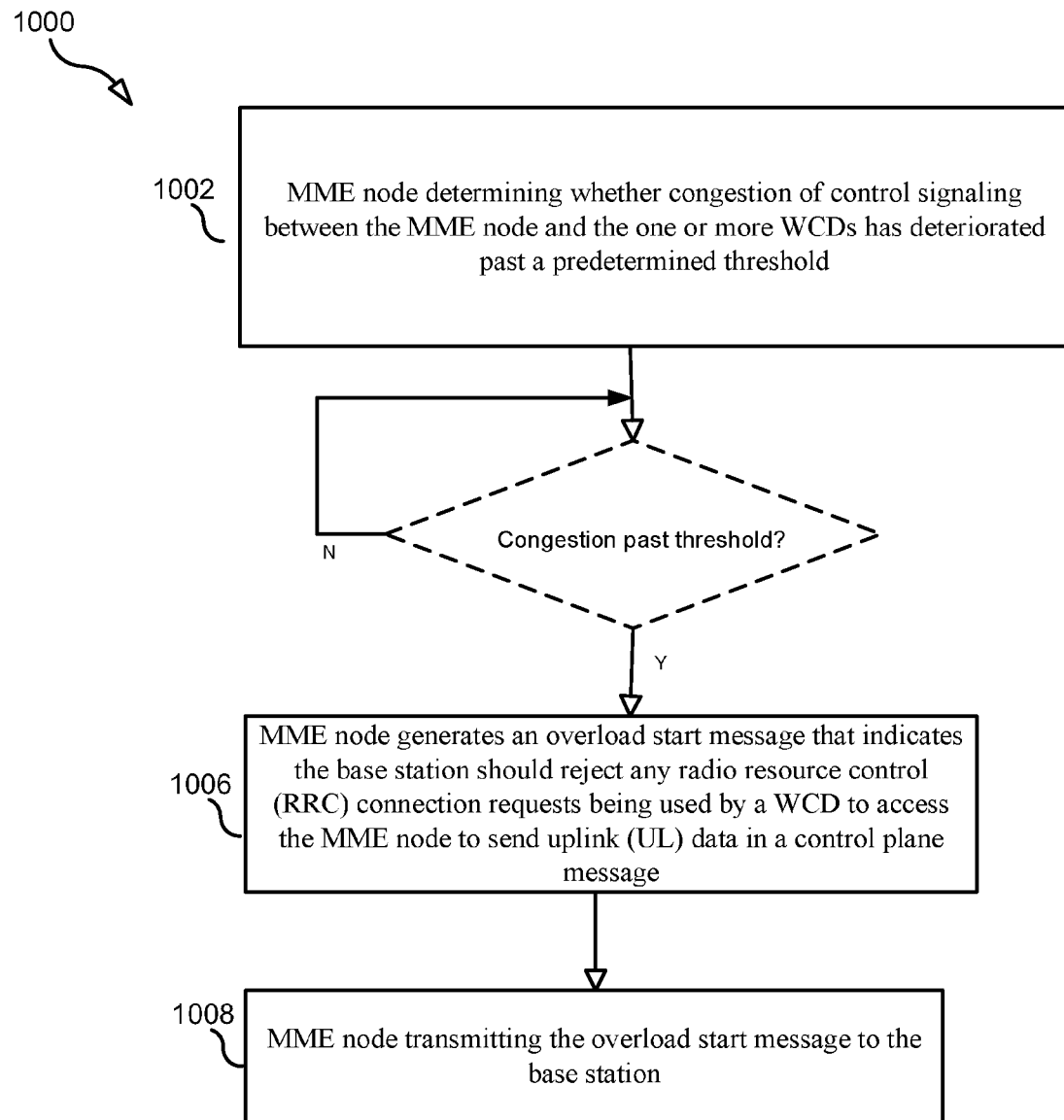

FIG. 10 illustrates another example of an overload handling mechanism that involves coordination between a MME node and base station. This example includes a process 1000 that begins, in an embodiment, in step 1002, in which the MME node determines whether congestion of control signaling between the MME node and the one or more WCDs has deteriorated past a predetermined threshold. In step 1006, in response to determining that the congestion has deteriorated past the predetermined threshold, the MME node generates an overload start message that indicates the base station should reject any radio resource control (RRC) connection requests being used by a WCD to access the MME node to send uplink (UL) data in a control plane message (i.e., a request from the WCD for data transfer via control plane CIoT EPS Optimization).

In step 1008, the MME node transmitting the overload start message to the base station.

Figure 11:
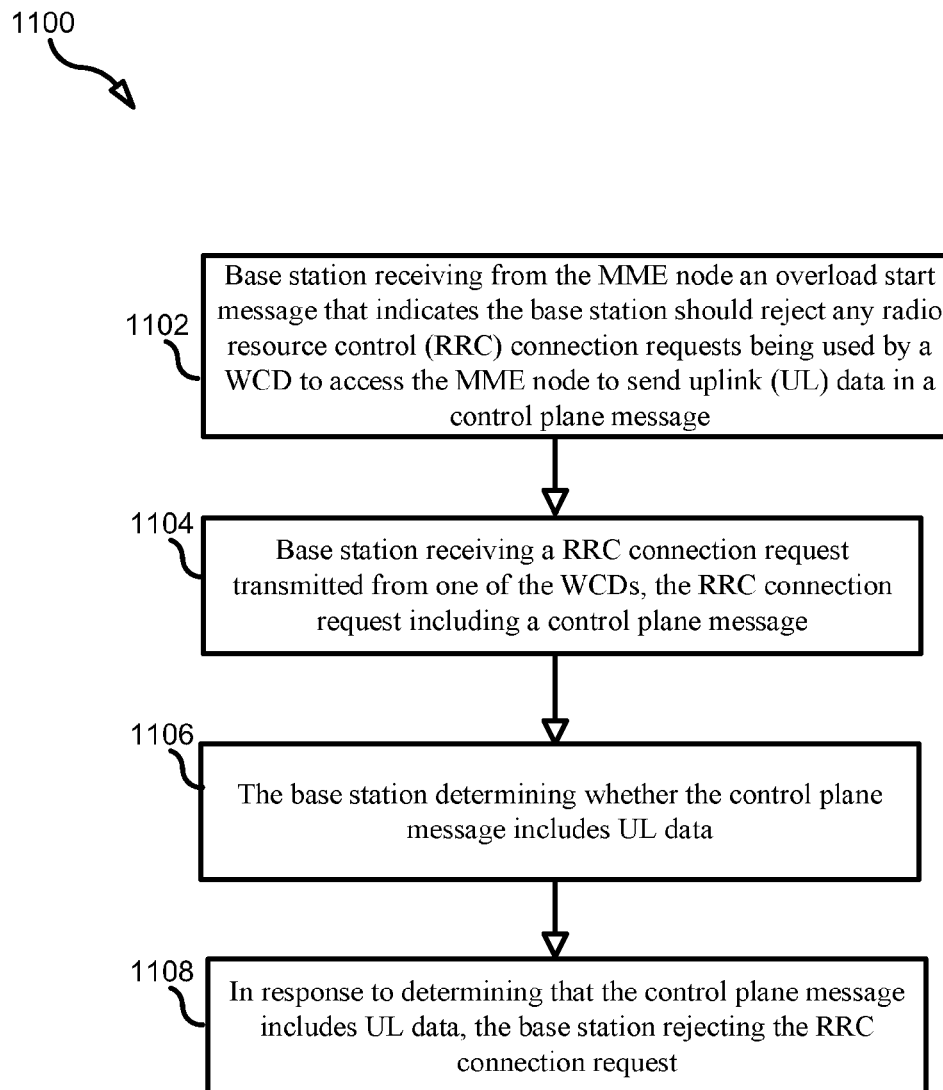

FIG. 11 illustrates a process 1100 that is from the perspective of the base station. In step 1102, the base station receives an overload start message transmitted by the MME node, the message indicating the base station should reject any radio resource control (RRC) connection requests being used by a WCD to access the MME node to send uplink (UL) data in a control plane message (i.e., a request from the WCD for data transfer via control plane CIoT EPS Optimization).

In step 1104, after receiving the overload start message, the base station receives a RRC connection request from one of the WCDs, the RRC connection request including a control plane message (i.e., the request is a request for data transfer via control plane CIoT EPS Optimization). In step 1106, the base station determines whether the control plane message includes UL data. In step 1108, in response to determining that the control plane message includes UL data, the base station rejecting the RRC connection request. In some instances, the information for whether the control plane message includes UL data may be in the header of the RRC connection request.

Exemplary MME Node

Figure 12:
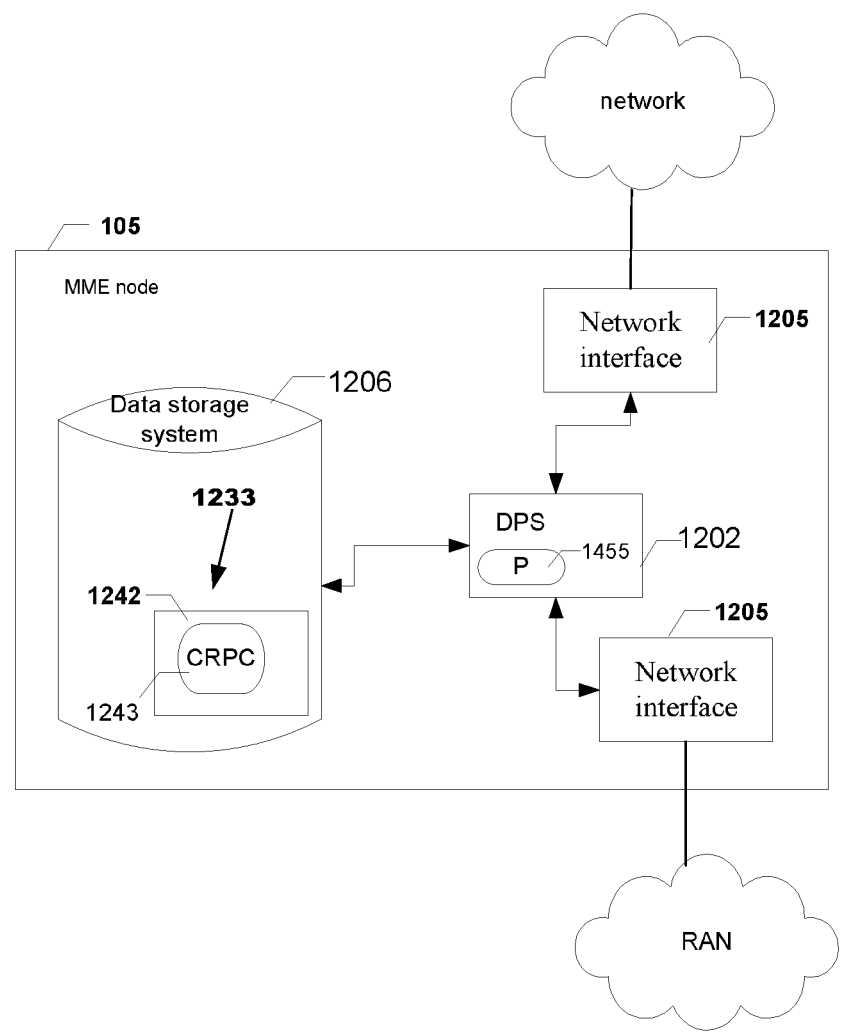
FIG. 12 illustrates an example MME node configured to manage congestion, according to aspects of the present disclosure.

FIG. 12 illustrates a block diagram of an example MME node 105. As shown in FIG. 12, the interference mitigation controller may include: a data processing system 1202, which may include one or more processors 1255 (e.g., microprocessors and/or one or more circuits, such as an application specific integrated circuit (ASIC), Field-programmable gate arrays (FPGAs), etc.); a communication interface 1205 for communicating with the RAN and an interface 1205 for communicating with a SCEF node, a data storage system 1206, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1202 includes a processor (e.g., a microprocessor), a computer program product 1233 may be provided, which computer program product includes: computer readable program code 1243 (e.g., instructions), which implements a computer program, stored on a computer readable medium 1242 of data storage system 1206, such as, but not limited to, magnetic media (e.g., a hard disk), optical media (e.g., a DVD), memory devices (e.g., random access memory), etc. In some embodiments, computer readable program code 1243 is configured such that, when executed by data processing system 1202, code 1243 causes the data processing system 1202 to perform steps described herein. In some embodiments, the MME node may be configured to perform steps described above without the need for code. For example, data processing system 1202 may consist merely of specialized hardware, such as one or more application-specific integrated circuits (ASICs). Hence, the features of the present invention described above may be implemented in hardware and/or software.

Exemplary Wireless Communication Device (WCD)

Figure 13:
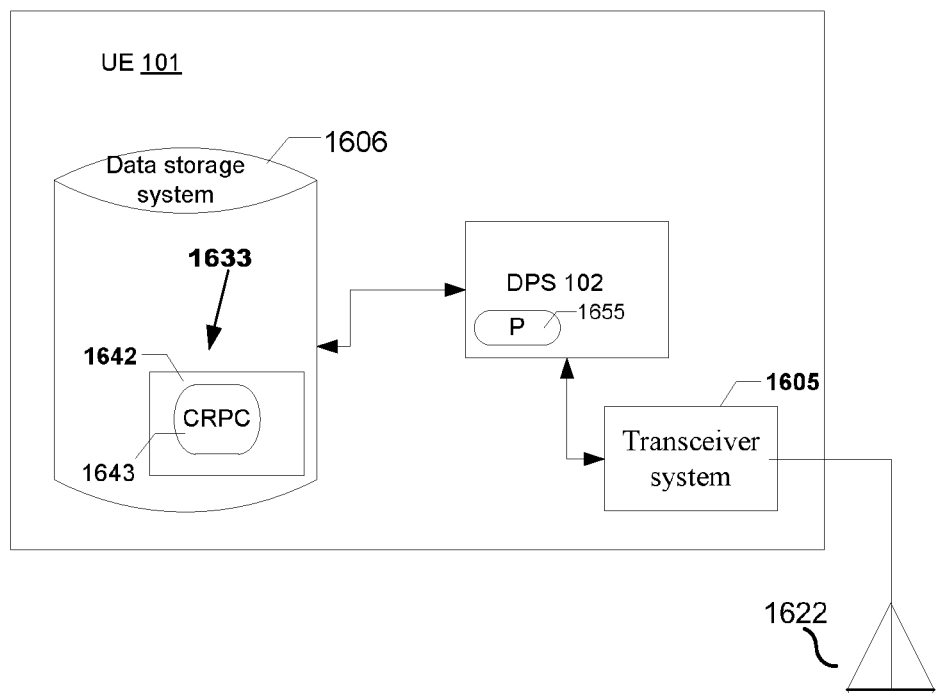
FIG. 13 illustrates an example UE configured to manage congestion, according to aspects of the present disclosure.

FIG. 13 illustrates a block diagram of an example of the WCD 106. As shown in FIG. 16, WCD 106 may include: the data processing system (DPS) 1602 (which includes, e.g., a digital signal processor (DSP), which may include one or more processors (P) 1655 (e.g., microprocessors) and/or one or more circuits, such as an application specific integrated circuit (ASIC), Field-programmable gate arrays (FPGAs), etc.; a transceiver 1605, each connected to an antenna 1622, for wirelessly transmitting and receiving information, respectively; a data storage system 1606, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1602 includes a processor 1655 (e.g., a microprocessor), a computer program product 1633 may be provided, which computer program product includes: computer readable program code 1643 (e.g., instructions), which implements a computer program, stored on a computer readable medium 1642 of data storage system 1606, such as, but not limited to, magnetic media (e.g., a hard disk), optical media (e.g., a DVD), memory devices (e.g., random access memory), etc. In some embodiments, computer readable program code 1643 is configured such that, when executed by data processing system 1602, code 1643 causes the data processing system 1602 to perform steps described herein.

In some embodiments, WCD 106 is configured to perform steps described above without the need for code 1643. For example, data processing system 1602 may consist merely of specialized hardware, such as one or more application-specific integrated circuits (ASICs). Hence, the features of the present invention described above may be implemented in hardware and/or software. For example, in some embodiments, the functional components of WCD 106 described above may be implemented by data processing system 1602 executing program code 1643, by data processing system 1601 operating independent of any computer program code 1643, or by any suitable combination of hardware and/or software. In a second embodiment, WCD 106 further includes: 1) a display screen coupled to the data processing system 1602 that enables the data processing system 1602 to display information to a user of WCD 106; 2) a speaker coupled to the data processing system 1602 that enables the data processing system 1602 to output audio to the user of UE 1602; and 3) a microphone coupled to the data processing system 1602 that enables the data processing system 1602 to receive audio from the user.

Exemplary SCEF Node

Figure 14:
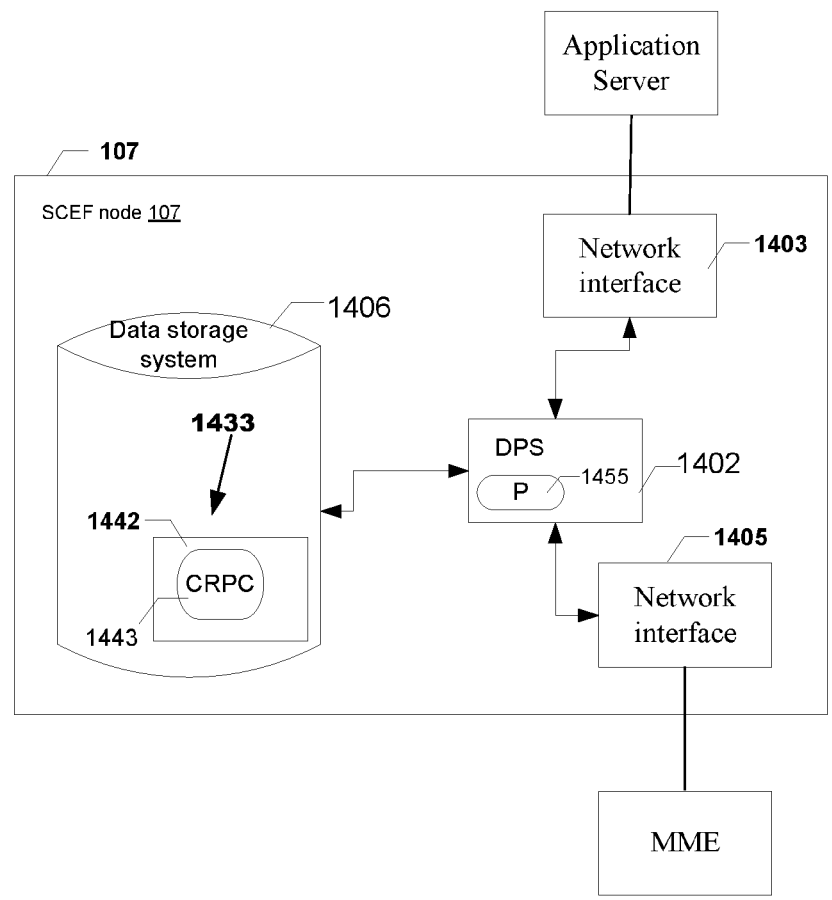
FIG. 14 illustrates an example SCEF node configured to manage congestion, according to aspects of the present disclosure.

FIG. 14 illustrates a block diagram of an example of a SCEF node 107. As shown in FIG. 14, the interference mitigation controller may include: a data processing system 1702, which may include one or more processors 1455 (e.g., microprocessors and/or one or more circuits, such as an application specific integrated circuit (ASIC), Field-programmable gate arrays (FPGAs), etc.); a communication interface 1405 for communicating with the MME; a network interface 1403 for interfacing with a SCS/AS 109, a data storage system 1406, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1402 includes a processor (e.g., a microprocessor), a computer program product 1433 may be provided, which computer program product includes: computer readable program code 1443 (e.g., instructions), which implements a computer program, stored on a computer readable medium 1442 of data storage system 1406, such as, but not limited, to magnetic media (e.g., a hard disk), optical media (e.g., a DVD), memory devices (e.g., random access memory), etc. In some embodiments, computer readable program code 1443 is configured such that, when executed by data processing system 1402, code 1443 causes the data processing system 1402 to perform steps described herein. In some embodiments, SCEF node may be configured to perform steps described above without the need for code 1443. For example, data processing system 1402 may consist merely of specialized hardware, such as one or more application-specific integrated circuits (ASICs). Hence, the features of the present invention described above may be implemented in hardware and/or software.

Exemplary Base Station

Figure 15:
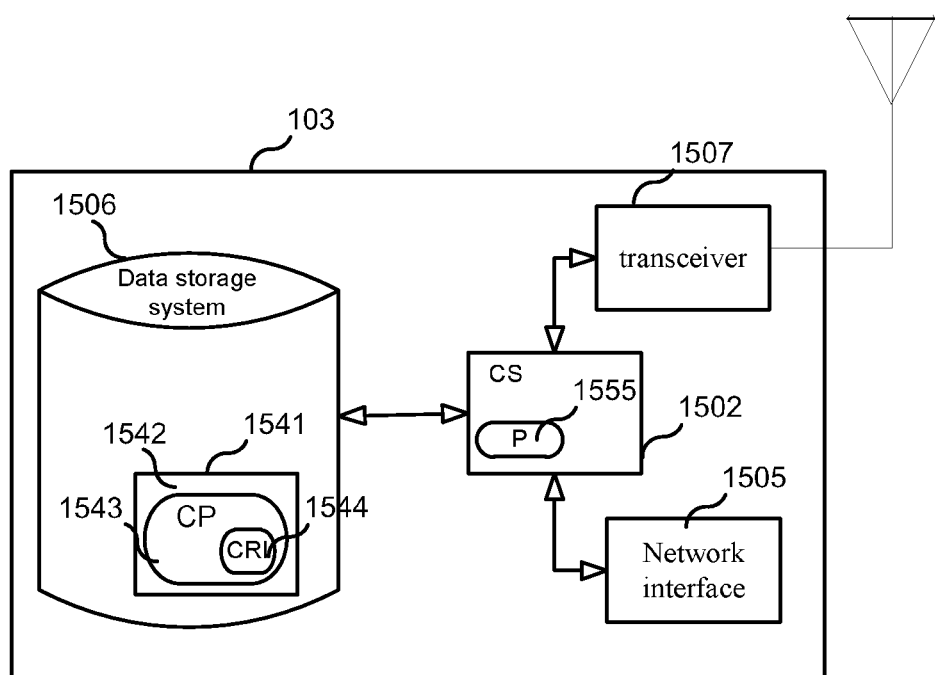
FIG. 15 illustrates an example base station configured to manage congestion, according to aspects of the present disclosure.

FIG. 15 is a block diagram of an embodiment of a base station. As shown in FIG. 15, the base station (e.g., eNB/NB 103) may include: a computer system (CS) 1502, which may include one or more processors 1555 (e.g., a general purpose microprocessor and/or one or more other data processing circuits, such as an application specific integrated circuit (ASIC), field-programmable gate arrays (FPGAs), and the like); a network interface 1505 for use in connecting the network node to a network (e.g., core network) and communicating with other units connected to the network; a transceiver 1507 coupled to an antenna 1508 for wirelessly communicating with WCDs; and a data storage system 1506 for storing information (e.g., network slice information received from network management node (e.g., NM or DM), which may include one or more non-volatile storage devices and/or one or more volatile storage devices (e.g., random access memory (RAM)). In embodiments where computer system 1502 includes a general purpose microprocessor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium (i.e., magnetic media (e.g., a hard disk), optical media (e.g., a DVD), flash memory, and the like). In some embodiments, the CRI 1544 of computer program 1543 is configured such that when executed by data processing system 1502, the CRI causes the computer system to perform steps described herein. In other embodiments, computer system 1502 may consist merely of one or more ASICs. Hence, the features of the embodiments described herein may be implemented in hardware and/or software.

TS 23.401 4.3.7.4.2.1 General

NAS level congestion control contains the functions: "APN based congestion control" and "General NAS level Mobility Management control".

The use of the APN based congestion control is for avoiding and handling of EMM and ESM signalling congestion associated with UEs with a particular APN. Both UEs and network shall support the functions to provide APN based EMM and ESM congestion control.

The MME may detect the NAS signalling congestion associated with the APN and start and stop performing the APN based congestion control based on criteria such as: Maximum number of active EPS bearers per APN; Maximum rate of EPS Bearer activations per APN; One or multiple PDN GWs of an APN are not reachable or indicated congestion to the MME; Maximum rate of MM signalling requests associated with the devices with a particular subscribed APN; and/or Setting in network management.

The MME may detect the NAS signalling congestion associated with the UEs belonging to a particular group. The MME may start and stop performing the group specific NAS level congestion control based on criteria such as: Maximum rate of MM and SM signalling requests associated with the devices of a particular group; and/or Setting in network management.

The MME may detect the NAS signalling congestion associated with the UEs that belong to a particular group and are subscribed to a particular APN. The MME may start and stop performing the APN and group specific NAS level congestion control based on criteria such as: Maximum number of active EPS bearers per group and APN; Maximum rate of MM and SM signalling requests associated with the devices of a particular group and a particular subscribed APN; and/or Setting in network management.

The MME should not apply NAS level congestion control for high priority access and emergency services.

With General NAS level Mobility Management control, the MME may also use the reject of NAS level Mobility Management signalling requests under general congestion conditions.

TS 23.401 4.3.7.4.1a Throttling of Downlink Data Notification Requests

Under unusual circumstances (e.g. when the MME load exceeds an operator configured threshold), the MME may restrict the signalling load that its SGWs are generating on it, if configured to do so.

The MME can reject Downlink Data Notification requests for non-priority traffic for UEs in idle mode or to further offload the MME, the MME can request the SGWs to selectively reduce the number of Downlink Data Notification requests it sends for downlink non-priority traffic received for UEs in idle mode according to a throttling factor and for a throttling delay specified in the Downlink Data Notification Ack message.

The SGW determines whether a bearer is to be subjected to the throttling of Downlink Data Notification Requests on the basis of the bearer's ARP priority level and operator policy (i.e. operator's configuration in the SGW of the ARP priority levels to be considered as priority or non-priority traffic). While throttling, the SGW shall throttle the Downlink Data Notification Requests for low and normal priority bearers by their priority. The MME determines whether a Downlink Data Notification request is priority or non-priority traffic on the basis of the ARP priority level that was received from the SGW and operator policy.

If ISR is not active for the UE, during the throttling delay, the SGW drops downlink packets received on all its non-priority bearers for UEs known as not user plane connected (i.e. the SGW context data indicates no downlink user plane TEID) served by that MME in proportion to the throttling factor, and sends a Downlink Data Notification message to the MME only for the non throttled bearers.

If ISR is active for the UE, during the throttling delay, the SGW does not send DDN to the MME and only sends the DDN to the SGSN. If both MME and SGSN are requesting load reduction, the SGW drops downlink packets received on all its non-priority bearers for UEs known as not user plane connected (i.e. the SGW context data indicates no downlink user plane TEID) in proportion to the throttling factors.

The SGW resumes normal operations at the expiry of the throttling delay. The last received value of the throttling factor and throttling delay supersedes any previous values received from that MME. The reception of a throttling delay restarts the SGW timer associated with that MME.

TS 23.401 4.3.7.4 MME Control of Overload 4.3.7.4.1 General

The MME shall contain mechanisms for avoiding and handling overload situations. These can include the use of NAS signalling to reject NAS requests from UEs.

In addition, under unusual circumstances, the MME shall restrict the load that its eNBs are generating on it if it is configured to enable the overload restriction. This can be achieved by the MME invoking the S1 interface overload procedure (see TS 36.300 [5] and TS 36.413 [36]) to all or to a proportion of the eNBs with which the MME has S1 interface connections. To reflect the amount of load that the MME wishes to reduce, the MME can adjust the proportion of eNBs which are sent S1 interface OVERLOAD START message, and the content of the OVERLOAD START message.

The MME should select the eNBs at random (so that if two MMEs within a pool area are overloaded, they do not both send OVERLOAD START messages to exactly the same set of eNBs).

The MME may optionally include a Traffic Load Reduction Indication in the OVERLOAD START message. In this case the eNB shall, if supported, reduce the type of traffic indicated according the requested percentage (see TS 36.413 [36]) (The MME implementation may need to take into account the fact that eNBs compliant to Release 9 and earlier version of the specifications do not support the percentage overload indication).

Using the OVERLOAD START message, the MME can request the eNB to: reject RRC connection requests that are for non-emergency and non-high priority mobile originated services (This blocks PS service and service provided by MSC following an EPS/IMSI attach procedure); reject new RRC connection requests for EPS Mobility Management signalling (e.g. for TA Updates) for that MME; only permit RRC connection requests for emergency sessions and mobile terminated services for that MME. This blocks emergency session requests from UEs with USIMs provisioned with Access Classes 11 and 15 when they are in their HPLMN/EHPLMN and from UEs with USIMs provisioned with Access Classes 12, 13 and 14 when they are in their home country (defined as the MCC part of the IMSI, see TS 22.011 [67]) (The MME can restrict the number of responses to paging by not sending paging messages for a proportion of the events that initiate paging. As part of this process, the MME can provide preference for paging UEs with Emergency Bearer Services and terminations associated with MPS ARP); only permit RRC connection requests for high priority sessions and mobile terminated services for that MME; reject new RRC connection requests from UEs that access the network with low access priority.

When rejecting an RRC connection request for overload reasons the eNB indicates to the UE an appropriate timer value that limits further RRC connection requests for a while.

An eNB supports rejecting of RRC connection establishments for certain UEs as specified in TS 36.331 [37]. Additionally, an eNB provides support for the barring of UEs configured for Extended Access Barring, as described in TS 22.011 [67]. These mechanisms are further specified in TS 36.331 [37].

An eNB may initiate Extended Access Barring when: all the MMEs connected to this eNB request to restrict the load for UEs that access the network with low access priority; or requested by O&M.

If an MME invokes the S1 interface overload procedure to restrict the load for UEs that access the network with low access priority, the MME should select all eNBs with which the MME has S1 interface connections. Alternatively, the selected eNBs may be limited to a subset of the eNBs with which the MME has S1 interface connection (e.g. particular location area or where devices of the targeted type are registered).

During an overload situation the MME should attempt to maintain support for emergency bearer services (see clause 4.3.12) and for MPS (see clause 4.3.18).

When the MME is recovering, the MME can either: send, to some, or all, of the eNB(s), OVERLOAD START messages with new percentage value that permit more traffic to be carried, or the MME sends OVERLOAD STOP messages to some, or all, of the eNB(s).

In addition, to protect the network from overload the MME has the option of rejecting NAS request messages which include the low access priority indicator before rejecting NAS request messages without the low access priority indicator (see clause 4.3.7.4.2 for more information) (It cannot be guaranteed that voice services will be available for mobile terminated calls while the Mobility Management back-off timer is running. It is recommended, that UEs requiring voice services are not configured for low access priority).

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Advantages of this application includes, but are not limited to:

The advantage of this application is generally to provide rate control, congestion control, and/or flow control of UL data from a UE and DL data from a SCEF.

The advantage is to that the control plane of the 3GPP system is not overloaded by CIoT devices (UEs) sending uplink small data, which could have severe effects on the system's ability to send control signaling between the MME and the UE and between the eNB and the UE. Further, using the SCEF means that DL transmission is blocked at the edge of the 3GPP network when excessive DL data has been sent and rate control is triggered, thus not wasting any additional network resources.

The advantage is also that the rate control involves the UE (the CIoT device), that is, UL transmission is blocked in the UE when excessive data has been sent and rate control is triggered, thus not wasting any additional radio resources.

The advantage is also that the control plane of the 3GPP system is not overloaded by Servers on the Internet or Packet Data Networks (PDNs) sending downlink small data to CIoT devices (UEs), which could have severe effects on the system's ability to send control signaling between the MME and the UE and between the eNB and the UE.

Concise Description of Some Embodiments

1) Rate Control Method Performed by MME

In one aspect there is provided a rate control method performed by a mobility management entity (MME). In one embodiment, the method includes the MME receiving an uplink (UL) Non-Access Stratum (NAS) message (e.g., attach request) transmitted by a wireless communication device (WCD). The method further includes the MME, after receiving the UL NAS message, generating a downlink (DL) NAS message and transmitting the DL NAS message towards the WCD. The DL NAS message transmitted by the MME comprises information indicating a number of UL NAS messages containing user data that the WCD is permitted send to the MME within a certain time period.

In some embodiments, the number of UL NAS messages indicated by the information included in the DL NAS message is zero. In some embodiments, the DL NAS message transmitted by the MME comprises information indicating the certain time period. In some embodiments, the UL NAS message transmitted by the WCD comprises user data, and the method further comprises the MME forwarding the user data to another device. In some embodiments, the method further includes the MME receiving a second UL NAS message transmitted by the WCD, wherein the second UL NAS message comprises user data intended for another device; and the MME discarding the user data such that the MME does not forward the user data to the another device.

2) Another MME Method

In another aspect there is provided a method performed in a mobility management entity (MME) node for managing signaling congestion. In one embodiment the method includes the MME node receiving (e.g., accepting) a first control plane message (e.g., a non-access stratum (NAS) message, such as a NAS attach request message) transmitted by the WCD, the first control plane message including uplink (UL) data (e.g., user plane data) intended for relay by the MME node to another device. The method also includes after receiving the first control message, the MME node creating a second control message (e.g., a NAS attach accept message), the second control plane message identifying at least one of: i) a throttling factor that indicates a level by which the WCD should reduce the amount of UL data in any future control plane message to the MME node, and ii) a throttling delay that indicates how much time the WCD should wait before including any UL data in any future control plane message to the MME. The method further includes the MME node transmitting the second control plane message including the at least one of the throttling factor and the throttling delay, the second control plane message intended for the WCD.

In some embodiments, the method further comprises the MME node determining whether congestion of control signaling between the MME node and the WCD has deteriorated past a predetermined threshold, wherein the step of transmitting the second control plane message including the throttling factor or the throttling delay is performed in response to receiving first control plane message from the WCD and determining that congestion has deteriorated past the predetermined threshold.

In some embodiments, the method further comprises the MME node determining whether the WCD has exceeded a predetermined maximum data quota or maximum data rate, wherein the step of transmitting the second control plane message including the throttling factor or the throttling delay is performed in response to receiving first control plane message from the WCD and determining that the WCD has exceeded a predetermined maximum data quota or maximum data rate.

In some embodiments, the method further comprises, after transmitting the second control plane message, the MME node transmitting a third control plane message which includes no throttling factor and no throttling delay, wherein the omission of the throttling factor and the throttling delay is an indication that the one or more WCDs can stop throttling UL data in control plane messages.

In some embodiments, the method further comprises the MME node, after transmitting the second control plane message, the MME node transmitting a third control plane message which includes another throttling factor or another throttling delay, wherein the other throttling delay overrides the throttling delay in the second control plane message and the other throttling factor overrides the throttling factor in the second control plane message.

In some embodiments, the throttling factor indicates that the WCDs should include no UL data in any future control plane message to the MME node until the MME node indicates stopping of throttling.

In some embodiments, the method further comprises the MME node determining a maximum bit rate (MBR) at which to limit UL data in the control plane between the MME node and one or more WCDs attached to the MME node; and the MME determining the throttling factor or the throttling delay based on the determined MBR.

In some embodiments, the control plane message is a non-access stratum (NAS) message transmitted as a payload by the WCD to a eNB in a RRC message and relayed from the eNB to the MME node as a payload in an uplink S1-AP message.

3) Method Performed by WCD

In another aspect, there is provided a method performed in a wireless communication device (WCD) for managing signaling congestion. In some embodiments, the method includes the WCD transmitting a first control plane message which includes uplink (UL) data intended for relay by a mobility management entity (MME) node to another device, the first control plane message intended for the MME node. The method further includes the WCD receiving a second control plane message transmitted from a mobility management entity (MME) node. The second control plane message includes at least one of: i) a throttling factor that indicates a level by which the WCD should reduce the amount of UL data in any future control plane message to the MME node and ii) a throttling delay that indicates how much time the WCD should wait before including any UL data in any future control plane message to the base station or to the MME. The method further includes, after receiving the second control plane message, the WCD transmitting a third control plane message with an amount of UL data (e.g., zero amount of UL data) based on the throttling factor, or with zero amount of UL data if the a timer set based on the throttling delay has not yet expired, the third control plane message intended for the MME node.

In some embodiments, the method further includes, after receiving the second control plane message, the WCD receiving a third control plane message transmitted from the MME node, the third control plane message including no throttling factor and no throttling delay; and after receiving the third control plane message, the WCD transmitting toward the MME node a fourth control plane message that includes UL data, the amount of UL data not being based on any throttling factor or any throttling delay.

In some embodiments, the method further includes, after receiving the second control plane message, the WCD receiving a third control plane message transmitted from the MME node, the third control plane message including another throttling factor or another throttling delay, wherein the other throttling delay overrides the throttling delay in the second control plane message and the other throttling factor overrides the throttling factor in the second control plane message.

4) Method Performed by MME Linked to a SCEF

In another aspect, there is provided a method performed in a mobility management entity (MME) node linked to a service capability exposure function (SCEF) node and to one or more wireless communication devices (WCDs). In one embodiment, the method includes the MME node determining whether one or more throttling criteria have been met (e.g., whether congestion of control signaling between the MME node and the one or more WCDs has deteriorated past a predetermined threshold). The method further includes, in response to determining that the one or more throttling criteria have been met (e.g., congestion of control signaling has deteriorated past the predetermined threshold): the MME node creating a first data delivery message (e.g., MT NIDD response or NIDD submit downlink ack message) that includes at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node. The method further includes the MME node transmitting the first data delivery message including the at least one of the throttling factor and the throttling delay, the first data delivery message intended for the SCEF node.

In some embodiments, the throttling factor or the throttling delay in the first data delivery message applies to requests from the SCEF that include non-internet-protocol (non-IP) data to be delivered to one of the one or more WCDs.

In some embodiments, the first data delivery message is a mobile terminated (MT) non-IP data delivery (NIDD) acknowledgement message and the DL data delivery requests being throttled are MT NIDD delivery requests that include DL data for the one or more WCDs.

In some embodiments, the method further includes receiving a previous data delivery request from the SCEF, wherein the step of transmitting the first data delivery message is in response to determining that congestion has deteriorated past the predetermined threshold and to receiving the previous data delivery request.

In some embodiments, the method further includes the MME node, after transmitting the first data delivery message including the at least one of the throttling factor and the throttling delay, transmitting a second data delivery message which includes no throttling factor and no throttling delay, wherein the omission of the throttling factor and the throttling delay is an indication that the SCEF node can stop throttling data delivery requests to the MME node.

In some embodiments, the method further includes the MME node, after transmitting the first data delivery message including the at least one of the throttling factor and the throttling delay, transmitting a second data delivery message which includes another throttling factor or another throttling delay, wherein the other throttling factor overrides the throttling factor in the first data delivery message and the other throttling delay overrides the throttling delay in the first data delivery message.

In some embodiments, the method further includes the MME node determining a maximum bit rate (MBR) at which to limit DL data in the control plane between the MME node and the one or more WCDs; and the MME determining the throttling factor or the throttling delay based on the determined MBR.

5) A Method Performed by a SCEF

In another aspect, there is provided a method performed in a service exposure capability function (SCEF) node. In one embodiment the method includes the SCEF receiving a first data delivery message (e.g., NIDD submission ack message or MT NIDD response message) transmitted by a mobility management entity (MME) node, the first data delivery message including at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node. The method further includes after receiving the second control plane message, the SCEF reducing the number of data delivery requests transmitted to the MME node based on the throttling factor, or refraining from transmitting any data delivery request to the MME node if a timer based on the throttling delay has not yet expired.

In some embodiments, the method further includes, after receiving the first data delivery message, the SCEF node receiving a second data delivery message from the MME node that includes no throttling factor and no throttling delay; and after receiving the second data delivery message, the SCEF node stopping throttling of data delivery requests to the MME node.

In some embodiments, the method further includes, after receiving the first data delivery message, the SCEF node receiving a second data delivery message transmitted from the MME node, the second data delivery message including another throttling factor or another throttling delay, wherein the other throttling delay overrides the throttling delay in the first data delivery message and the other throttling factor overrides the throttling factor in the first data delivery message.

6) Another Method Performed by MME

In another aspect, there is provided a method performed in a mobility management entity (MME) node for managing signaling congestion, the MME node adapted to exchange control signaling with one or more wireless communication devices (WCDs) via a base station. The method includes the MME node determining whether congestion of control signaling between the MME node and the one or more WCDs has deteriorated past a predetermined threshold. The method further includes, in response to determining that congestion has deteriorated past the predetermined threshold, the MME generating an overload start message that indicates the base station should reject any radio resource control (RRC) connection requests being used by a WCD to access the MME node to send uplink (UL) data in a control plane message. The method further includes the MME node transmitting the overload start message toward the base station. In some embodiments, the overload control plane message applies to RRC connection requests being used by a WCD to access the MME node to send UL data having a normal priority level.

9) Base Station Method

In another aspect, there is provided a method performed in a base station for managing signaling congestion, the base station linked to a MME node and one or more wireless communication devices (WCDs). The method includes the base station receiving an overload start message transmitted by the MME node, the message indicating the base station should reject any radio resource control (RRC) connection requests being used by a WCD to access the MME node to send uplink (UL) data in a control plane message; after receiving the overload start message, the base station receiving a RRC connection request from one of the WCDs, the RRC connection request including a control plane message; the base station determining whether the control plane message includes UL data; and in response to determining that the control plane message includes UL data, the base station rejecting the RRC connection request.

10) Another MME Method

In another aspect, there is provided a method performed in a mobility management entity (MME) node for managing signaling congestion. The method includes the MME node determining whether one or more throttling criteria have been met; in response to determining that the one or more throttling criteria has been met, the MME node creating a control message (e.g., a NAS attach accept message), the control plane message identifying at least one of: i) a throttling factor that indicates a level by which the WCD should reduce the amount of UL data in any future control plane message to the MME node, and ii) a throttling delay that indicates how much time the WCD should wait before including any UL data in any future control plane message to the MME; and the MME node transmitting the control plane message including the at least one of the throttling factor and the throttling delay, the control plane message intended for the WCD. In some embodiments, the one or more throttling criteria includes at least one of: i) congestion of control signaling between the MME node and the WCD has deteriorated past a predetermined threshold; and ii) the WCD has exceeded a predetermined maximum data quota or maximum data rate.

11) Another WCD Method

In another aspect, there is provided a method performed in a wireless communication device (WCD) for managing signaling congestion. The method includes the WCD receiving a first control plane message transmitted from a mobility management entity (MME) node, the first control plane message including at least one of: a throttling factor that indicates a level by which the WCD should reduce the amount of UL data in any future control plane message to the MME node and ii) a throttling delay that indicates how much time the WCD should wait before including any UL data in any future control plane message to the base station or to the MME, wherein the first control plane message is transmitted in response to one or more throttling criteria having been met. The method further includes, after receiving the first control plane message, the WCD transmitting a second control plane message with an amount of UL data (e.g., zero amount of UL data) based on the throttling factor, or with zero amount of UL data if the a timer set based on the throttling delay has not yet expired, the second control plane message intended for the MME node.

12) Another MME Method

In another aspect, there is provided a method performed in a mobility management entity (MME) node linked to a service capability exposure function (SCEF) node and to one or more wireless communication devices (WCDs). The method includes the MME node receiving a first data delivery request transmitted by the SCEF node, the first data delivery request including DL data intended one of the one or more WCDs; after receiving the first data delivery request, the MME node creating a first data delivery response message that includes at least one of: i) a throttling factor that indicates a level by which the SCEF node should reduce the number of downlink (DL) data delivery requests to the MME node, and ii) a throttling delay that indicates how much time the SCEF node should wait before transmitting any future data delivery request to the MME node; and the MME node transmitting the first data delivery response message including the at least one of the throttling factor and the throttling delay, the first data delivery message intended for the SCEF node.

13) Another MME Method

In another aspect, there is provided a method for CN overload control. In one embodiment, the method includes a network node (e.g., MME) determining that a load has reached a threshold. The method further includes, after determining that the load has reached the threshold, the network node transmitting to a base station an Overload Start message comprising information for configuring the base station such that the base station rejects a request transmitted by a WCD for data transfer via control plane CIoT EPS Optimization.

14) Another Base Station Method

In another aspect, there is provided a method for CN overload control. In one embodiment, the method includes a base station receiving from a network node (e.g., MME) an Overload Start message comprising information indicating that the base station may reject a request for data transfer via control plane CIoT EPS Optimization. The method further includes, after receiving the Overload Start message, the base station receiving from a WCD a request for data transfer via control plane CIoT EPS Optimization. The method further includes, in response to receiving the request transmitted by the WCD, the base station rejecting the request.

15) MME Node

In another aspect, there is provided a mobility management entity (MME) node comprising one or more processors configured for performing any one of the MME methods disclosed herein.

16) WCD

In another aspect, there is provided a wireless communication device (WCD) comprising one or more processors configured for performing any one of the WCD methods disclosed herein.

17) SCEF Node

In another aspect, there is provided a SCEF node comprising one or more processors configured for performing any one of the SCEF methods disclosed herein.

18) Base Station

In another aspect, there is provided a base station comprising one or more processors configured for performing any one of the base station methods disclosed herein.

The invention claimed is:

1. A rate control method performed in a mobility management entity(MME), the method comprising:
the MME receiving an uplink (UL) Non-Access Stratum (NAS) message transmitted by a wireless communication device (WCD); and
the MME, in response to receiving the UL NAS message, generating a downlink (DL) NAS message and transmitting the DL NAS message towards the WCD, wherein
the DL NAS message transmitted by the MME comprises information indicating a number of UL NAS messages containing user data that the WCD is permitted send to the MME within a certain time period.

2. The rate control method of claim 1, wherein the number of UL NAS messages indicated by the information included in the DL NAS message is zero.

3. The rate control method of claim 1, wherein the UL NAS message comprises an Attach Request.

4. The rate control method of claim 1, wherein the DL NAS message transmitted by the MME comprises information indicating the certain time period.

5. The rate control method of claim 1, wherein
the UL NAS message transmitted by the WCD comprises user data, and
the method further comprises the MME forwarding the user data to another device.

6. The rate control method of claim 1, further comprising:
the MME receiving a second UL NAS message transmitted by the WCD, wherein the second UL NAS message comprises user data intended for another device; and
the MME discarding the user data such that the MME does not forward the user data to the another device.

7. A mobility management entity(MME) comprising:
a network interface operable to receive an uplink (UL) Non-Access Stratum (NAS) message transmitted by a wireless communication device (WCD); and
a data processing system comprising one or more processors, wherein the data processing system is configured such that, in response to the MME receiving the UL NAS message, the data processing system:
generates a downlink (DL) NAS message; and
employs the network interface to transmit the DL NAS message towards the WCD, wherein
the DL NAS message comprises information indicating a number of UL NAS messages containing user data that the WCD is permitted send to the MME within a certain time period.

8. The MME of claim 7, wherein the number of UL NAS messages indicated by the information included in the DL NAS message is zero.

9. The MME of claim 7, wherein the UL NAS message comprises an Attach Request.

10. The MME of claim 7, wherein the DL NAS message comprises information indicating the certain time period.

11. The MME of claim 7, wherein
the UL NAS message transmitted by the WCD comprises user data, and
the data processing system is further configured to forward the user data to another device.

12. The MME of claim 7, wherein
in response to the MME receiving a second UL NAS message transmitted by the WCD, wherein the second UL NAS message comprises user data intended for another device, the data processing system is configured to discard the user data such that the MME does not forward the user data to the another device.

13. A method for core network (CN) overload control, the method comprising:
a network node determining that a load has reached a threshold and
after determining that the load has reached the threshold, the network node transmitting to a base station an Overload Start message comprising information for configuring the base station to reject a request transmitted by a wireless communication device (WCD) for data transfer via control plane Cellular Internet-of-Things (CIoT) Evolved Packet System (EPS) Optimization.

14. The method of claim 13, wherein the network node is a mobility management entity.

15. The method of claim 13, wherein the network node transmits the Overload Start message to the base station as a result of the network node determining that the load has reached the threshold.

16. A mobility management entity (MME) comprising:
a network interface operable to receive an uplink (UL) Non-Access Stratum (DL) message transmitted by a first wireless communication device (WCD); and
a data processing system comprising one or more processors, wherein the data processing system is configured such that, as a result of determining that a load has reached a threshold, the data processing system:
employs the network interface to transmit an Overload Start message to a base station, wherein
the Overload Start message comprises information for configuring the base station such that the base station rejects a request transmitted by a WCD for data transfer via control plane Cellular Internet-of-Things (CIoT) Evolved Packet System (EPS) Optimization.

17. A method for core network (CN) overload control, the method comprising:
a base station receiving from a network node an Overload Start message comprising information indicating that the base station may reject a request for data transfer via control plane CIoT EPS Optimization;
after receiving the Overload Start message, the base station receiving from a WCD a request for data transfer via control plane Cellular Internet-of-Things (CIoT) Evolved Packet System (EPS) Optimization; and
in response to receiving the request transmitted by the WCD, the base station rejecting the request.

18. A base station comprising:
a transceiver for transmitting data to wireless communication devices and for receiving messages transmitted by the WCDs;
a network interface operable to receive an Overload Start message transmitted by a network node, the Overload Start message comprising information for indicating to the base station that the base station may reject a request transmitted by a WCD for data transfer via control plane Cellular Internet-of-Things (CIoT) Evolved Packet System (EPS) Optimization; and
a data processing system comprising one or more processors, wherein the data processing system is configured such that, after the base station receives the Overload Start message, the data processing system configures the base station to reject a request for data transfer via control plane CIoT EPS Optimization that was received from a WCD after the base station received the Overload Start message.

* * * * *